United States Patent Office 3,119,217
Patented Jan. 28, 1964

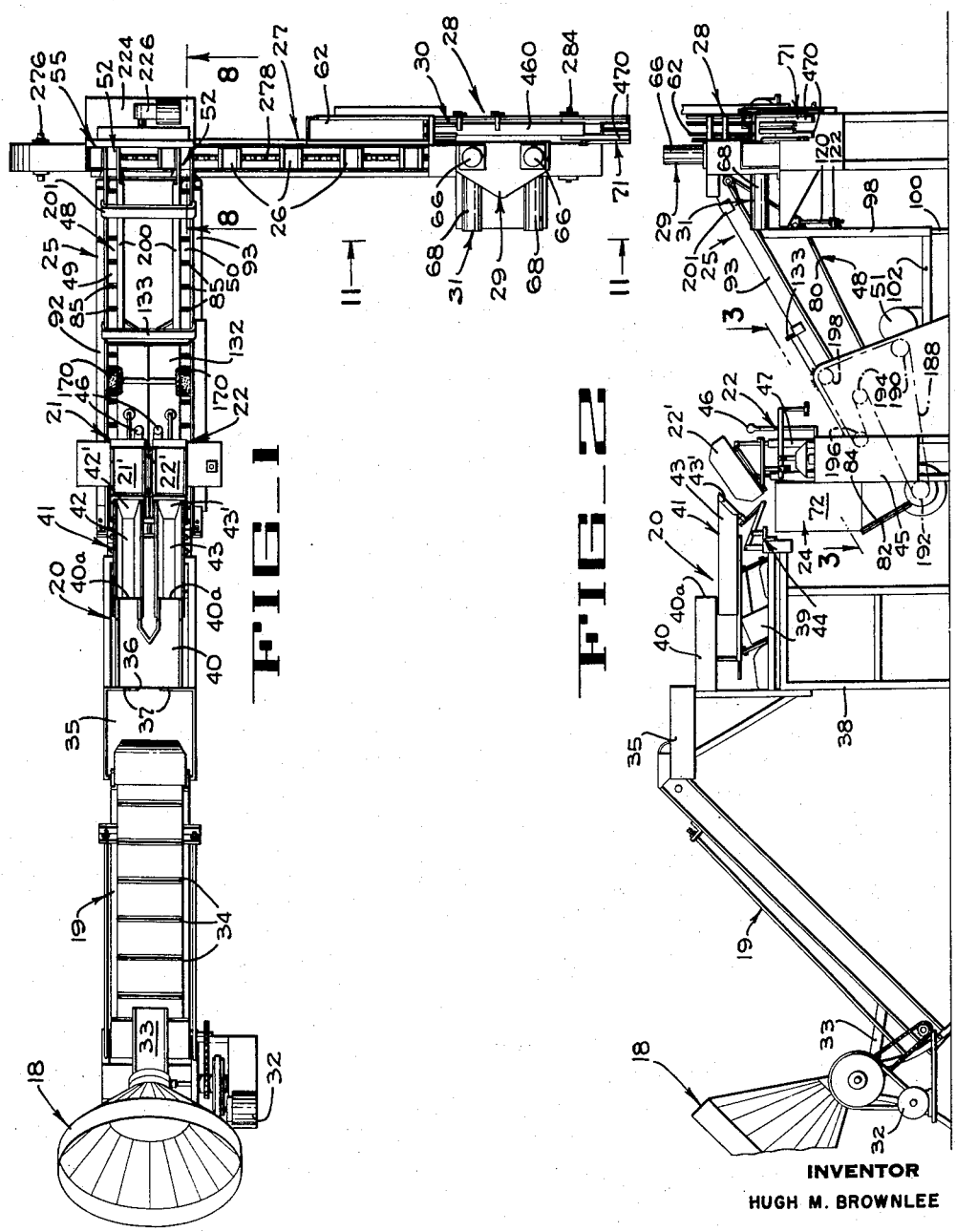

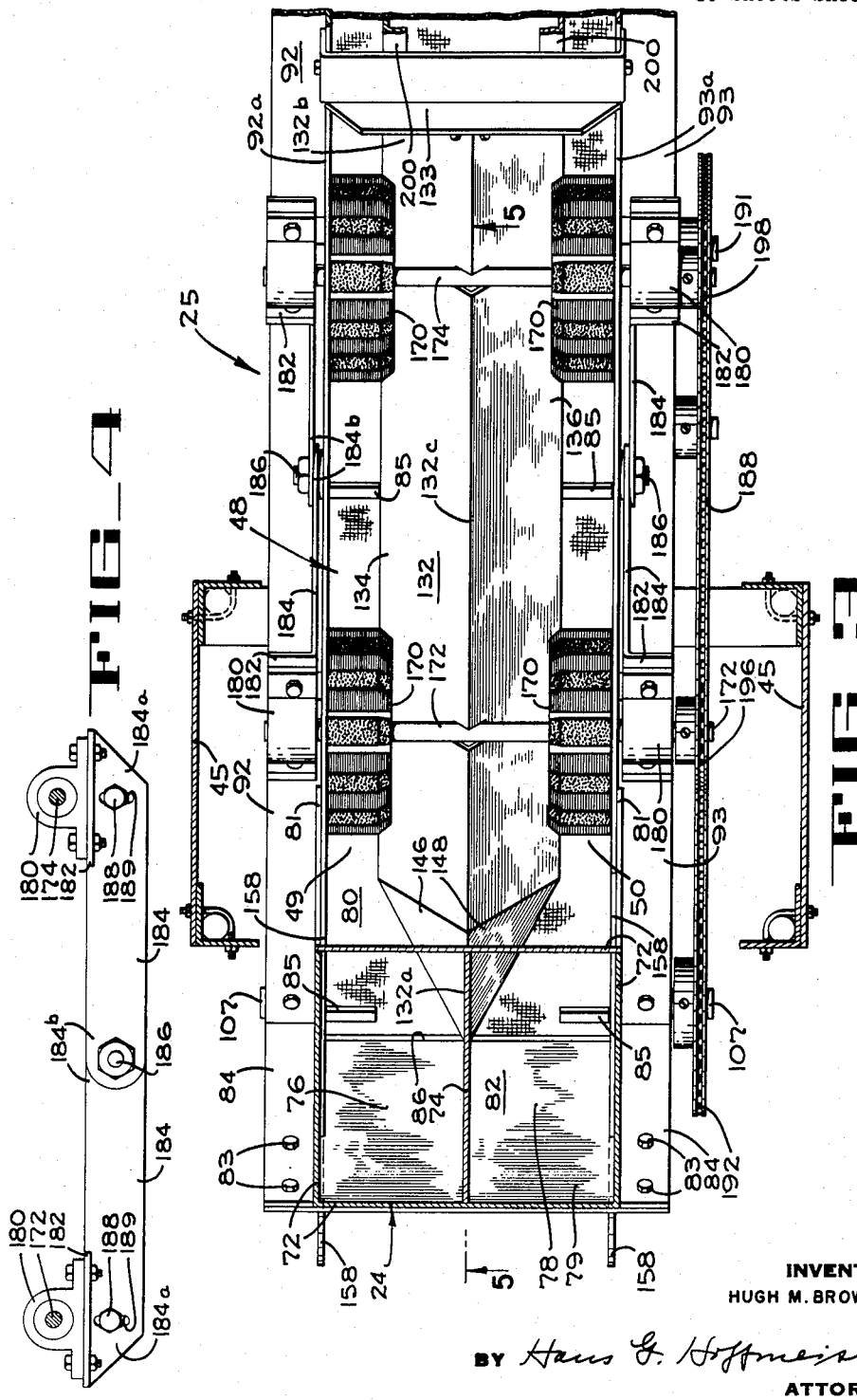

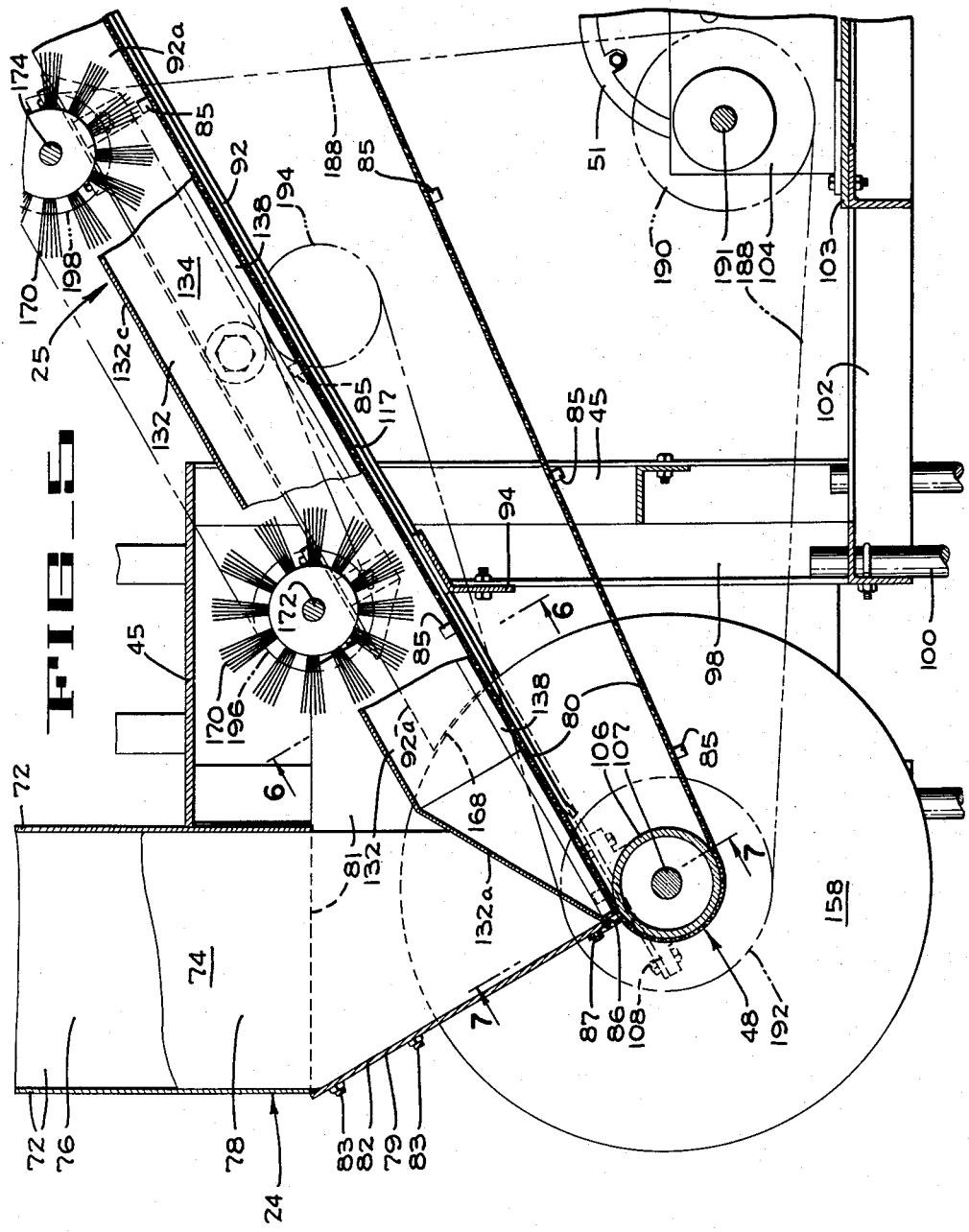

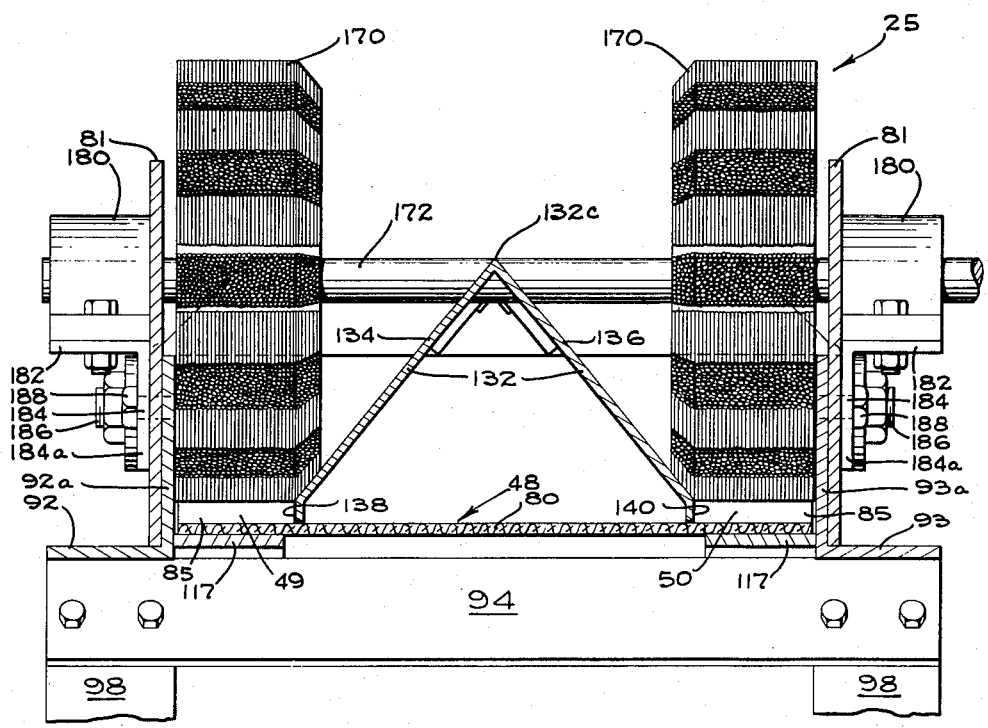
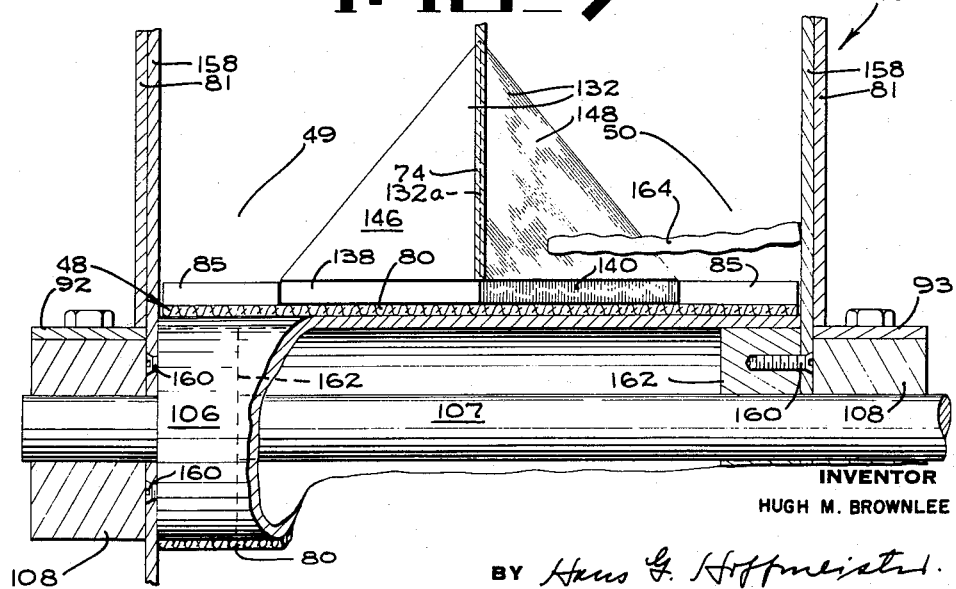

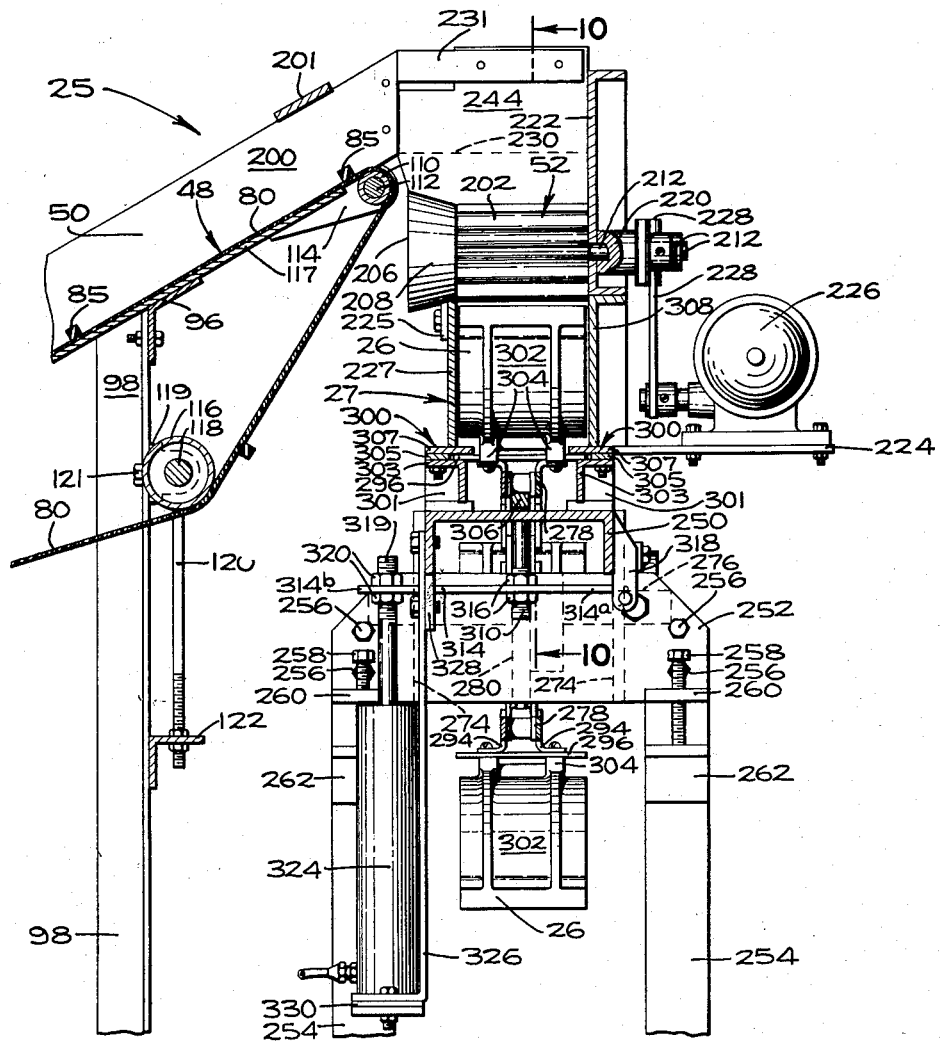

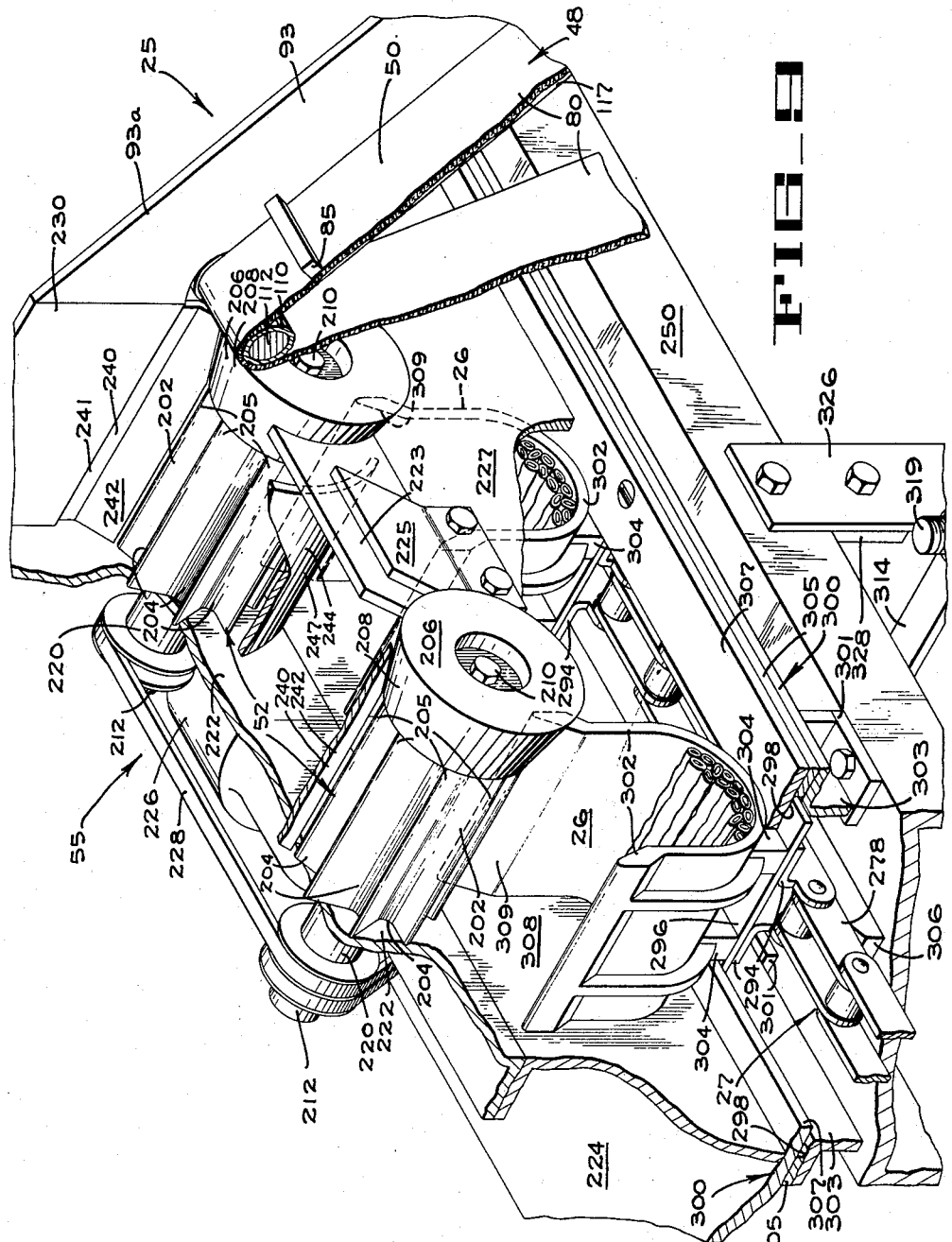

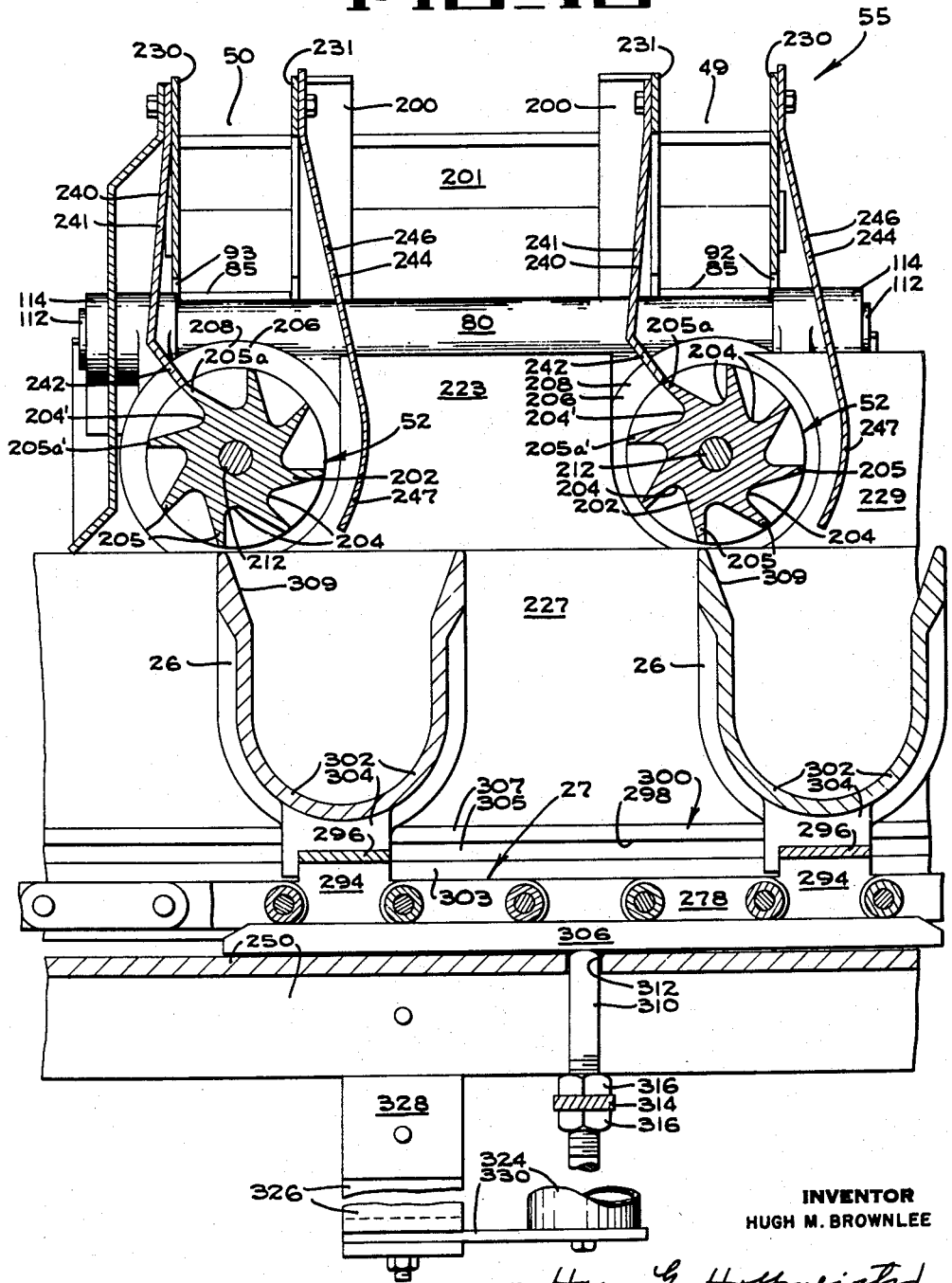

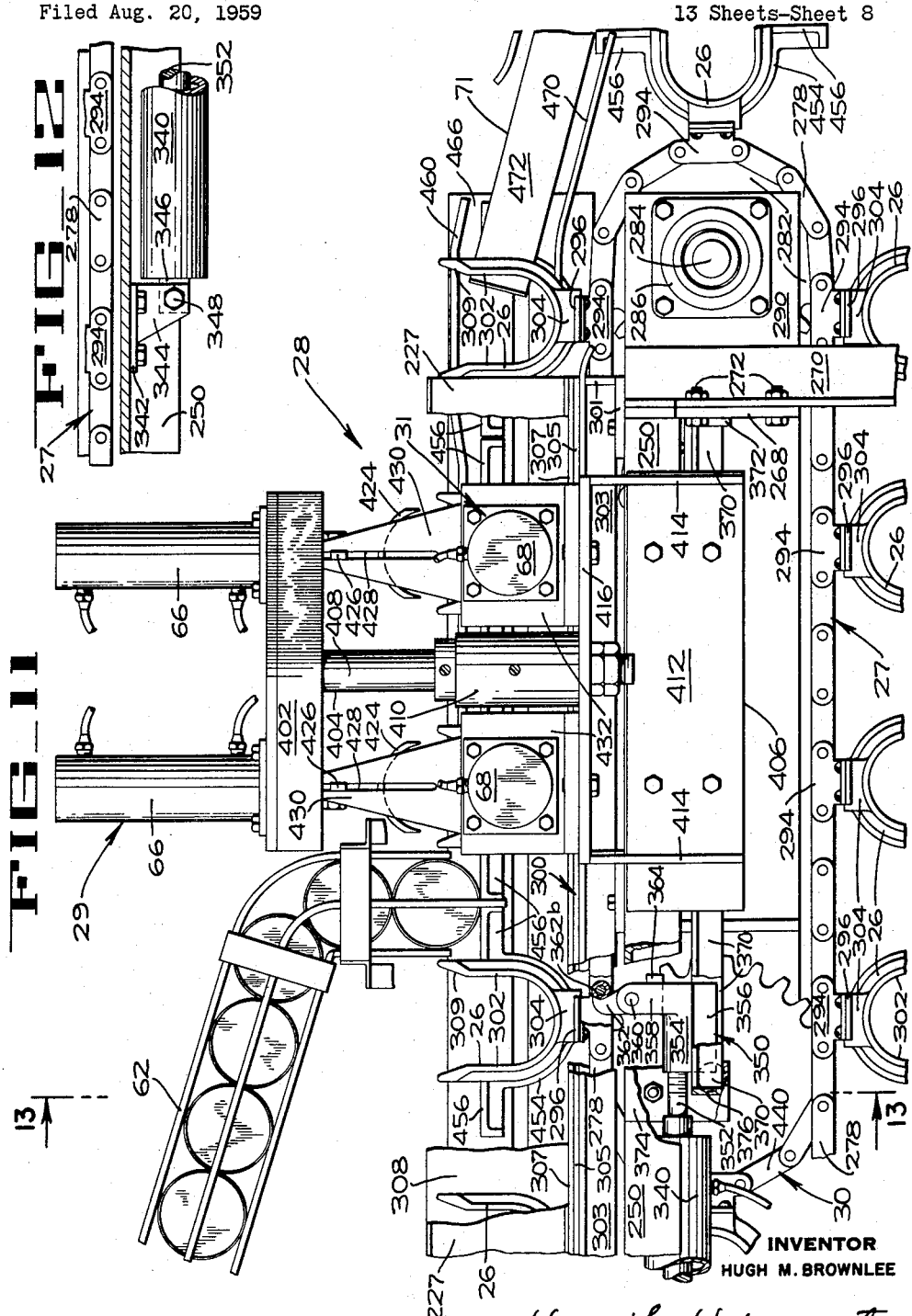

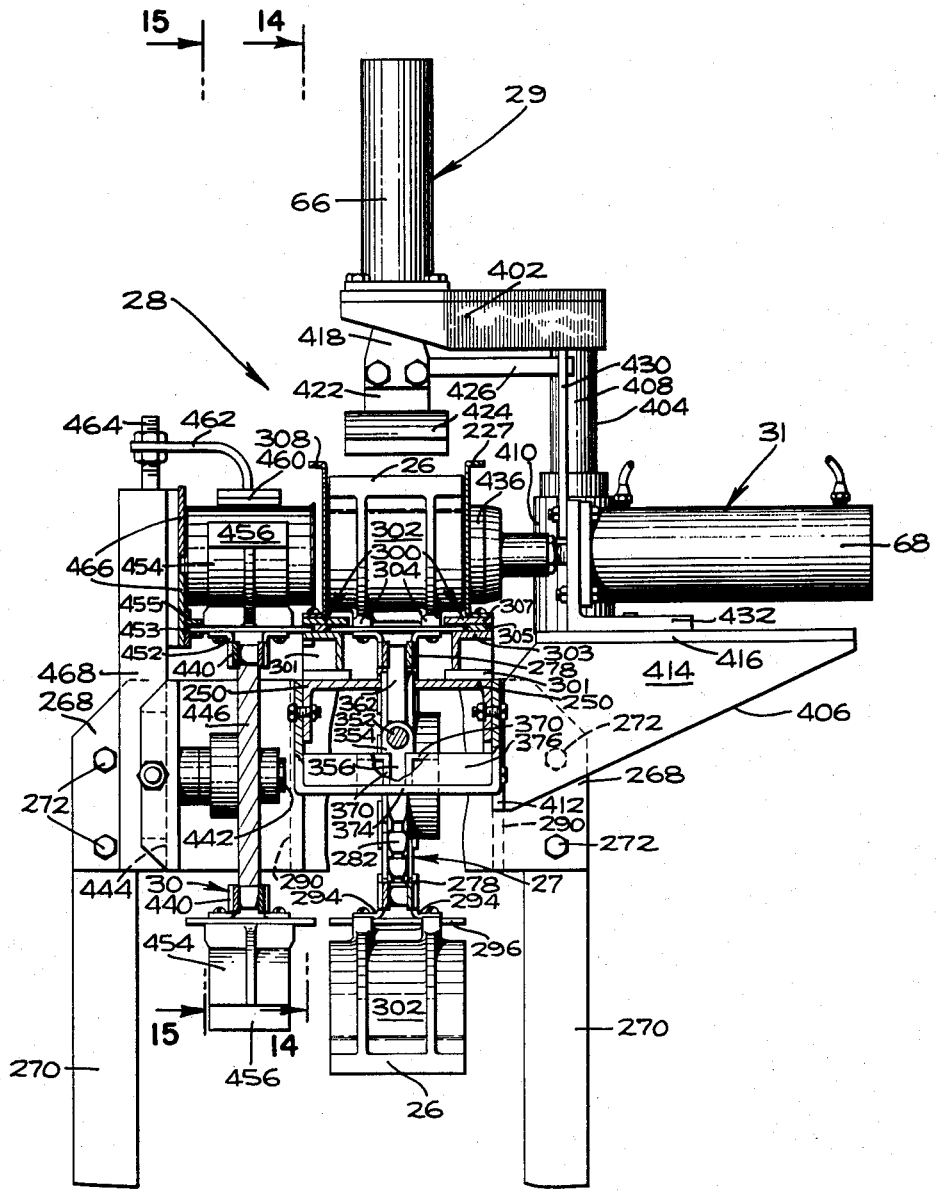

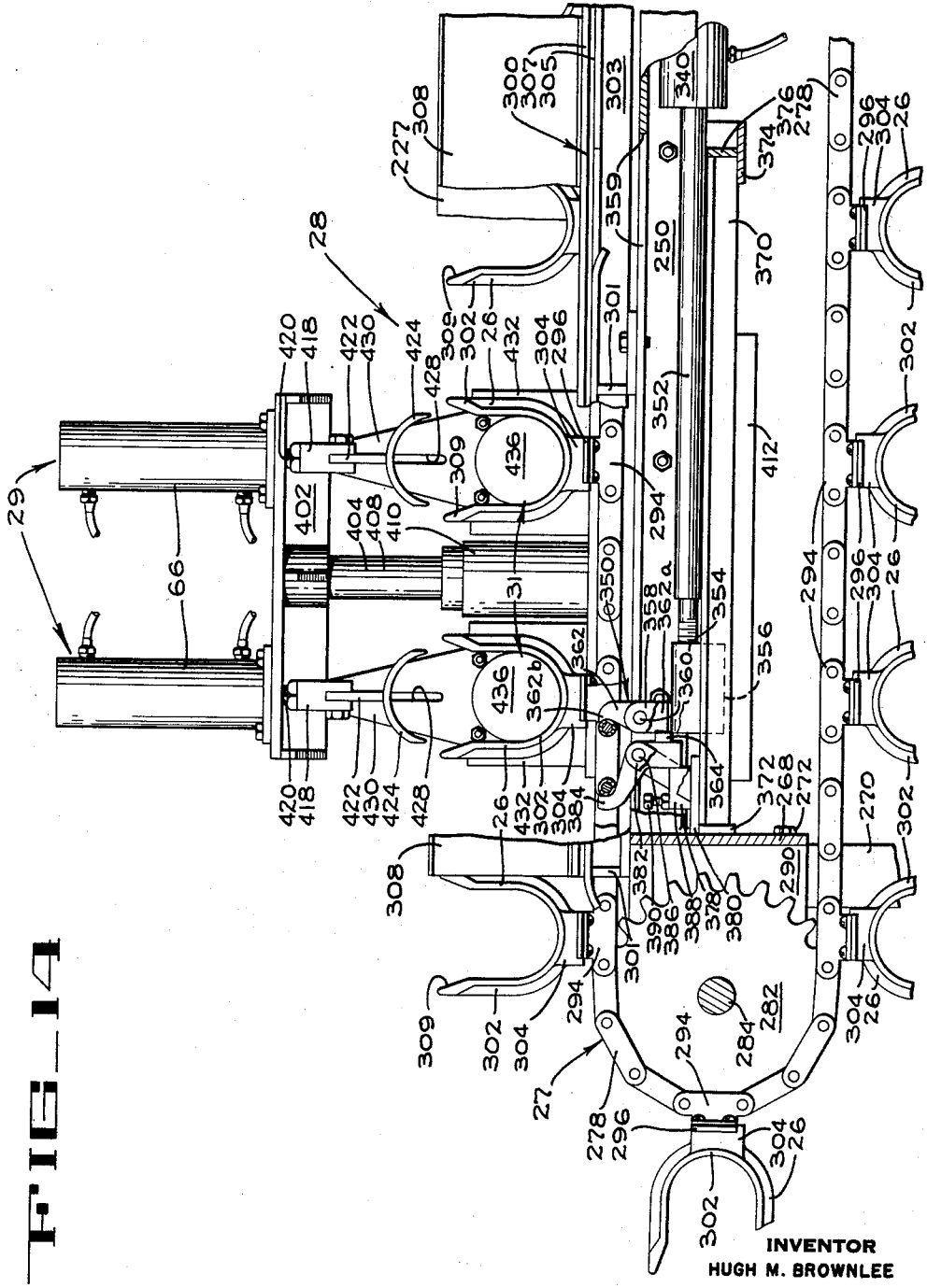

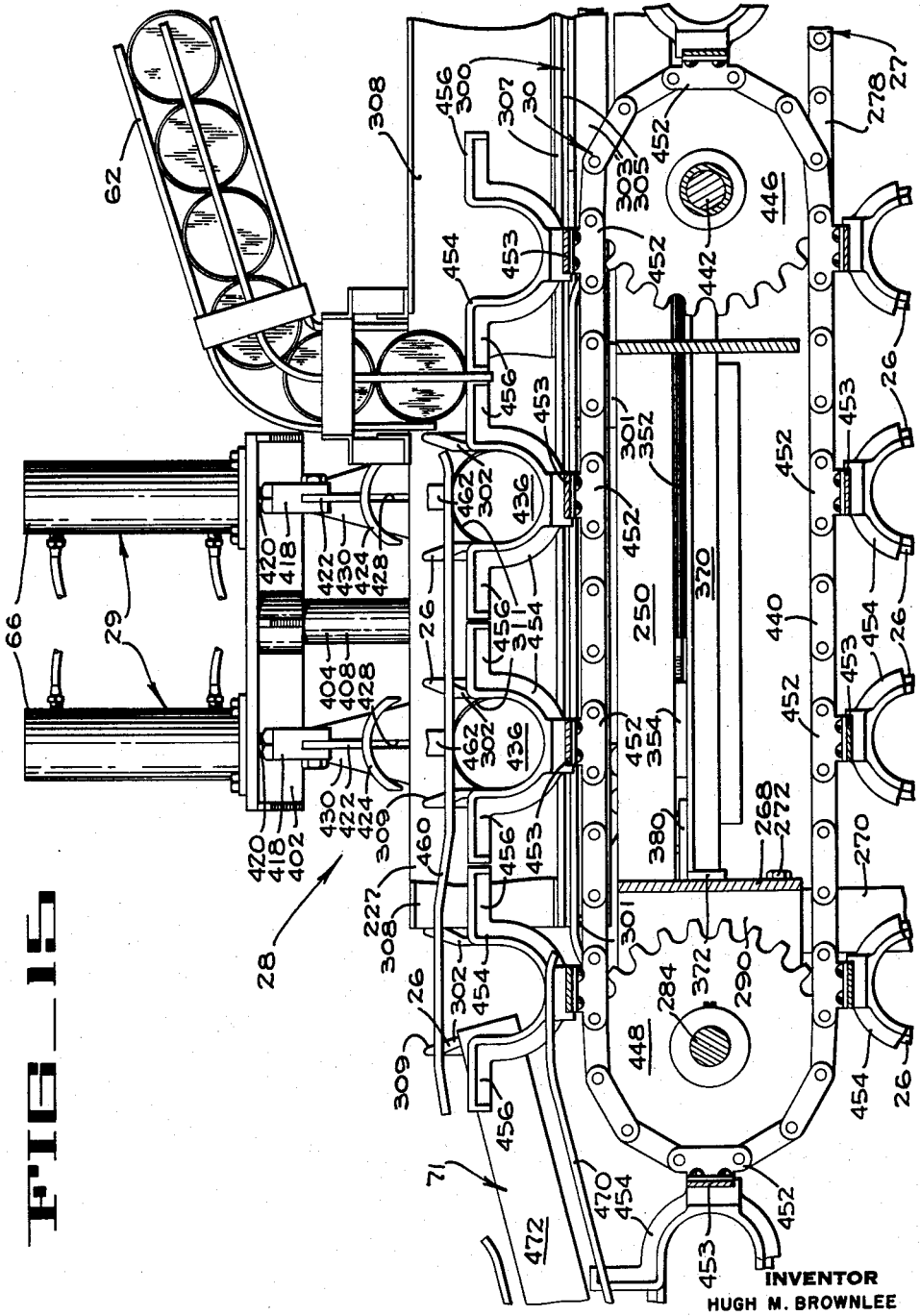

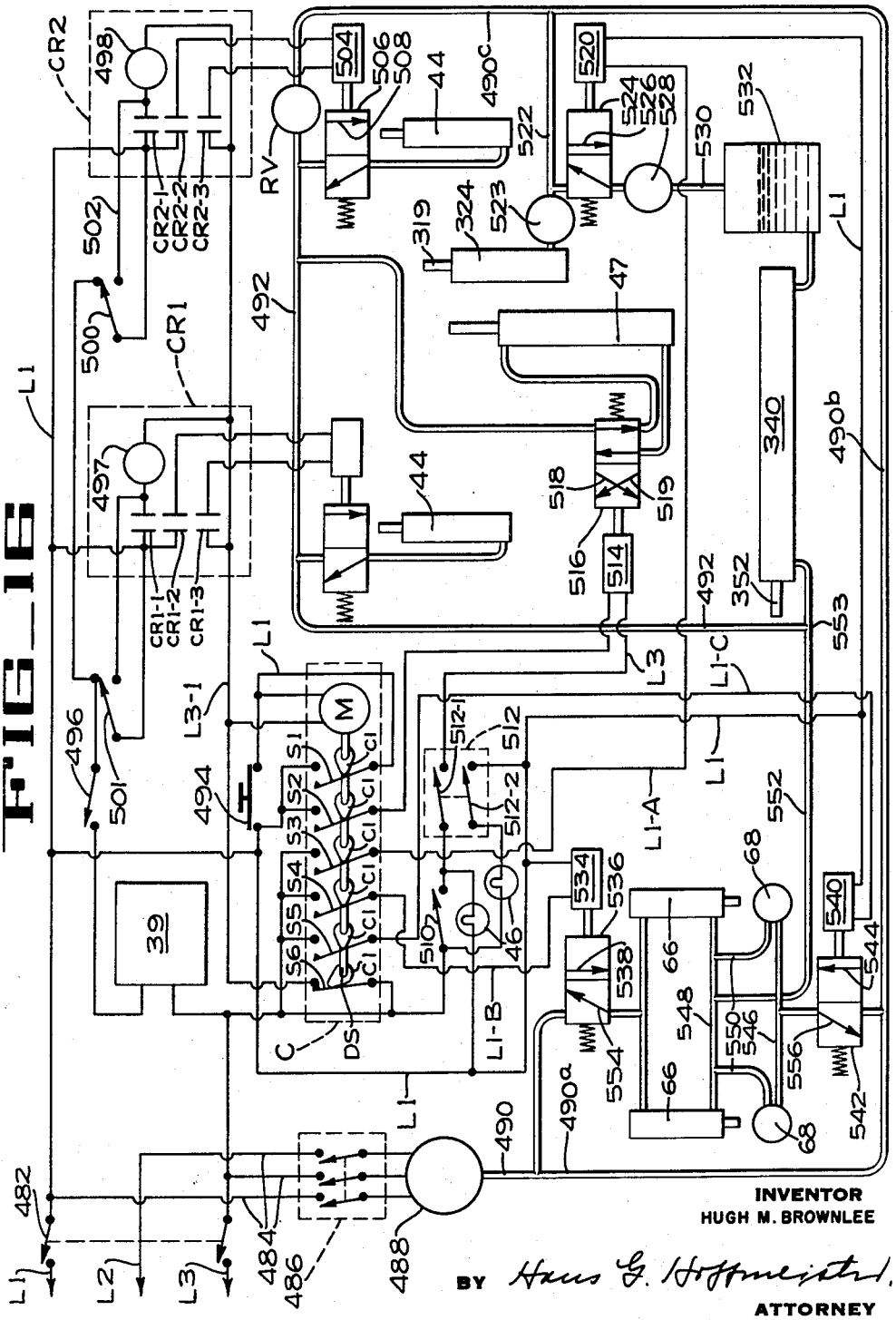

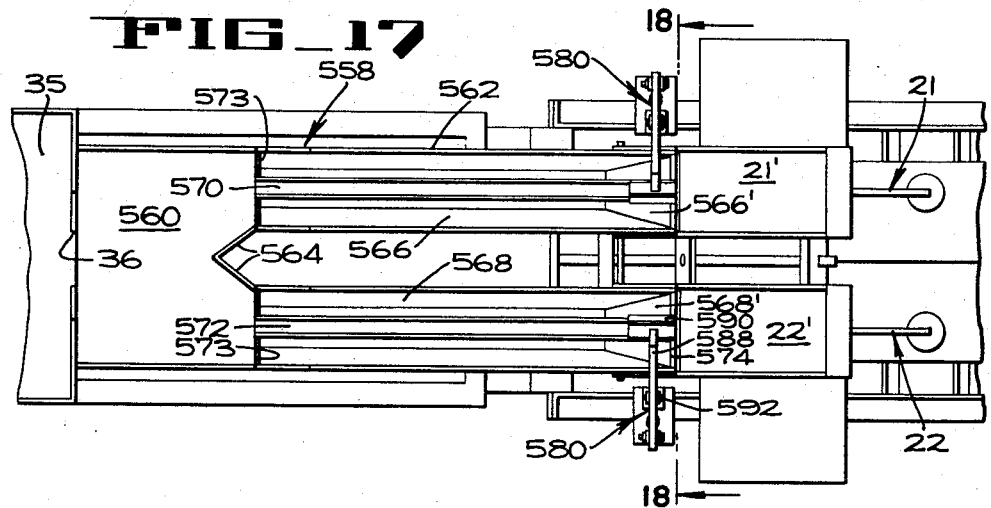
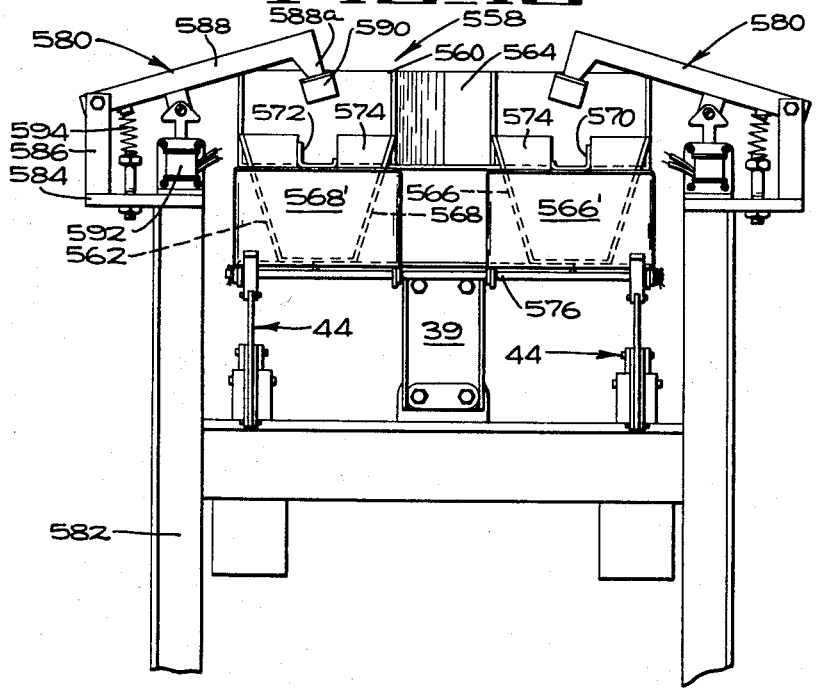

3,119,217
APPARATUS FOR PACKING ELONGATE
ARTICLES
Hugh M. Brownlee, Portland, Oreg., assignor to FMC
Corporation, a corporation of Delaware
Filed Aug. 20, 1959, Ser. No. 835,092
8 Claims. (Cl. 53—236)

The present invention appertains to article packing machines and more particularly relates to machines for trimming, weighing and packing elongate articles such as green beans into containers.

Processors of green beans, in seeking a larger market for their product, have attempted to pack green beans in jars or cans by adopting the asparagus style pack in which the beans are trimmed to the height of a container and packed upright therein. Although a large demand exists for this type of pack, the methods presently in use for producing such packs are slow and time consuming and accordingly the packed containers are too costly to have wide customer acceptance. Another limitation of the filling methods now being used arises from the fact that the beans are not accurately weighed. It is, therefore, necessary to overfill each container to meet minimum weight requirements with the result that the cost of the product must be increased.

Accordingly, it is an object of the present invention to provide a machine for producing a high quality, whole green bean, asparagus-style pack with a minimum of wasted product and the least possible amount of labor.

Another object of the present invention is to provide a machine for receiving a random mass of whole green beans, trimming each bean at both ends to a substantially uniform length, separating the beans into batches of uniform weight, assembling the batches into bundles of uniform size and shape, and packing these bundles into containers, such as cans.

Another object of the present invention is to provide a high speed machine for packing elongate articles into containers.

Another object is to provide an improved mechanism for receiving a random mass of whole green beans and separating the mass of beans to align each bean in longitudinal relation upon a conveyor.

Another object is to provide an efficient mechanism for transferring whole green beans from an aligning conveyor, either singly or in groups, to a receiving pocket of a second conveyor.

A further object of the present invention is to provide an improved can filling mechanism adapted to transport can filling charges of whole green beans, compact each charge to a diameter closely approximating that of the can in which it is to be packed, accurately register each of two adjacent can filling charges with an empty can, and simultaneously place both charges into the cans.

Another object is to provide an improved container conveyor for bean filling machines.

Another object is to provide an efficient mechanism for transferring elongate objects, such as beans, from the pocket of a conveyor to a container.

These and other objects and advantages of the present invention will become apparent from the following specification and the accompanying drawings, in which:

FIGURE 1 is a schematic plan view of a whole green bean processing line employing the apparatus of the present invention.

FIGURE 2 is a schematic side elevation of the apparatus illustrated in FIGURE 1.

FIGURE 3 is an enlarged section of a portion of a bean aligning conveyor, taken on lines 3—3 of FIGURE 2.

FIGURE 4 is a fragmentary elevation of a portion of the bean aligning conveyor of FIGURE 3.

FIGURE 5 is a longitudinal section of the aligning conveyor taken on line 5—5 of FIGURE 3, certain parts being broken away.

FIGURE 6 is an enlarged transverse section of the aligning conveyor taken on lines 6—6 of FIGURE 5.

FIGURE 7 is an enlarged transverse section of the aligning conveyor taken on lines 7—7 of FIGURE 5.

FIGURE 8 is an enlarged transverse section of the conveyor employed to transport individual weighed bundles of beans to the can filling mechanism and is taken on lines 8—8 of FIGURE 1.

FIGURE 9 is a fragmentary isometric view particularly showing the bean transfer reels used to assemble beans from the aligning conveyor of FIGURE 3 into bundles in the bean transport cups of the conveyor of FIGURE 8.

FIGURE 10 is a transverse section of the bean transfer reels of FIGURE 8 and is taken on lines 10—10 thereof.

FIGURE 11 is an elevation, partly broken away, of the can filling station and the discharge station, and is taken looking in the direction of lines 11—11 of FIGURE 1.

FIGURE 12 is a fragmentary section of a part of the mechanism of FIGURE 11.

FIGURE 13 is a transverse section of the can filling station of the conveyor of FIGURE 11, taken on lines 13—13 thereof.

FIGURE 14 is a longitudinal section through the can filling station of FIGURE 13 and is taken on lines 14—14 of FIGURE 13.

FIGURE 15 is a longitudinal section taken on lines 15—15 of Figure 13 illustrating the can conveying mechanism of the present invention, certain parts thereof being broken away.

FIGURE 16 is a schematic layout of the electrical, hydraulic and pneumatic controls used in the machine of the present invention.

FIGURE 17 is a plan view of a modification of part of the present invention.

FIGURE 18 is a fragmentary transverse section of the mechanism illustrated in FIGURE 17 and is taken on lines 18—18 thereof.

The green bean processing machine of the present invention comprises in general a bean cutter 18 (FIGS. 1 and 2) which trims beans to a predetermined length and delivers them to an upwardly inclined conveyor 19. The conveyor discharges the beans into a vibrating feeding unit 20 which, in turn, directs the beans into hoppers 21' and 22' of independently operating scale units 21 and 22. When a batch of beans of predetermined weight has been accumulated in each of the hoppers, the hoppers are tilted, and each of the two batches is dropped into a separate compartment of a feed hopper 24. From the hopper 24, the beams of each batch are carried upwardly through a bean orienting unit 25 in which the beans are arranged lengthwise of their direction of movement in substantially parallel relation. At the upper end of the aligning and conveying unit 25, each batch of beans is discharged separately into one of a plurality of carrier cups 26 of a conveyor 27, with the beans still disposed in parallel relation, generally transverse to the direction of movement of the carriers. Each batch of beans is carried to a can filling or transfer station 28 beneath a compacting unit 29 which is effective to form each batch into a generally cylindrical bundle. A container is aligned with each bean carrier cup 26 at the can filling or transfer station by means of a container conveyor 30, and a pusher mechanism 31, which is disposed on the opposite side of the bean carrier 26 from the container conveyor 30, engages the batch of beans in the carrier and pushes it into the container.

The bean cutter 18, which may be of the type disclosed in the patent to Mencacci, No. 2,770,274, is continuously driven by an electric motor 32. After each bean is trimmed to a length slightly less than the height of the container in which it is to be packed, it drops to a vibrating discharge pan 33 and gravitates to the open end thereof which overlies the lower end of the conveyor 19. The conveyor 19 is of the endless belt type and is provided with flights 34 (FIG. 1) which move the beans upwardly into an accumulating box 35, the floor of which is downwardly inclined. An opening 36 is provided in the end wall 37 of the box 35. An angle iron frame structure 38 supports the accumulating box 35 and also supports the feeding unit 20 which is disposed below the opening 36 and is arranged to receive beans dropping through the opening.

To effect movement of the mass of beans from the accumulating box 35 into the feed pan 20, a conventional electromechanical vibrator 39 (FIG. 2) is mounted at the upper part of the structure 38 beneath the feeding unit 20, and is operatively connected to the feeding unit and to the accumulating box 35 by means not shown.

The vibrating feeding unit 20, which is adapted to receive quantities of green beans issuing from the aperture 36 of the box 35 and to divide the beans into two lanes, comprises an upper level collecting pan 40 and a lower level pan 41. The upper pan 40 is provided at its rearward end with two open-end pan extensions 40a (FIG. 1) which channel the beans into two spaced parallel lanes. The lower level pan 41 extends rearwardly from a position beneath the open rear ends of the pan extensions 40a and includes two parallel troughs 42 and 43, each trough forming a guideway for the beans dropping from the pan extensions 40a. The bottom panels of the pans of the feed unit 20 are downwardly inclined in the same direction as the bottom of the accumulating box 35. For the purpose of regulating the flow of beans being moved through the troughs 42 and 43, the end of each trough is provided with a hinged gate 42' and 43', respectively. Each gate is pivoted to the bottom panel of its associated trough and is arranged to be moved to open or closed position by an air cylinder and linkage 44, only one of which is shown in FIGURE 2, in response to an electrical control mechanism which will later be described. Additionally, each gate 42' and 43' is adapted to form, in its lowered or open position, a downwardly inclined chute over which the beans in each trough descend by gravity.

In order to collect and weigh the beans dropping from the lowered gates 42' and 43', the distal end of each open gate is positioned over one of the scale hoppers 21' or 22'. Each scale hopper is pivotally connected to a balance beam of the associated scale unit 21 or 22. The scale units and their associated hoppers are mounted upon the upper end of a support table 45 made in the form of an inverted U.

The accumulating box 35, the feeding unit 20 and the vibrator 39 associated therewith are of conventional design and widely known and used in the art, and it is therefore not necessary to describe the details thereof. Likewise, the two scales 21 and 22 together with their associated hoppers and electrical control switches, are conventional units and will be later described only to the extent necessary for an understanding of their use in the present invention.

When a quantity of beans have dropped into one of the scale hoppers 21' or 22' and a certain pre-set maximum weight has been attained, an electrical circuit is completed which causes the air cylinder and linkage 44 to pivot the associated door to a closed position to stop the flow of beans to that hopper. When both hoppers contain the same weight of beans, an electrical circuit is de-energized to cause the vibrator 39 to stop. An attendant positioned adjacent the scale hopper 22' then manually adds beans to each scale hopper until a certain desired weight for the batch of beans in each hopper is attained. This weight is visually signalled to the attendant when the associated scale mechanism closes an electrical circuit to light a pilot light 46, one of which is positioned at the rear of each scale hopper. When both scale hoppers contain the desired weight of beans, both of the pilot lights 46 will be lighted, and an electrical switch is then actuated by the attendant to start a timer which activates an air operated dump cylinder 47 (FIG. 2), which will be described presently. Both scale hoppers 21' and 22' simultaneously dump the weighed batches of beans therein, as illustrated in FIGURE 2, into the compartmented feed hopper 24 which is secured to the table 45. The cycling timer controls the dumping cycle of the scale hoppers, as well as other functions of the machine, and after completion of the dumping cycle allows each hopper to receive another batch of beans.

The bean orienting unit 25 includes an upwardly inclined bean aligning conveyor 48 which extends from beneath the feed hopper 24 and the inverted U-shaped support table 45 to the upper run of the bean carrier conveyor 27, extending at a right angle to the aligning conveyor 48. The aligning conveyor 48 is adapted to receive the two separate weighed batches of beans from the scale hoppers 21' and 22' and move the batches upwardly in spaced lanes 49 and 50, aligning each bean of each batch parallel to the direction of travel of a belt upon which they are carried. An electric motor 51 (FIG. 2) of the bean aligning conveyor 48 provides drive means therefor.

The feed hopper 24, the aligning conveyor 48 and the subsequent mechanisms employed to complete the apparatus of the present invention are to be more fully disclosed and described later. For this reason, only a very general reference and description of these parts will be made here.

The aligned beans of each batch of beans are projected beyond the elevated discharge end of the aligning conveyor 48 onto one of two continuously rotating bean receiving members, or transfer reels, 52 at a cup filling station 55 (FIGS. 1 and 9), one reel being provided for each of the two lanes 49 and 50 of the conveyor 48. To support the beans during their transfer from the aligning conveyor 48 to the bean transporting conveyor 27, each reel is generally of the shape of a deeply fluted elongated cylinder, the axis of rotation of the cylinder and the flutes being disposed parallel to the lanes 49 and 50. The beans one by one or several at a time, are projected from each lane 49 and 50 and deposited in the flutes of the associated reel. The bean or beans lying in each flute are thus held in their aligned position until they drop by gravity to the conveyor 27 during continued rotation of the reel.

The bean transporting conveyor 27 comprises an endless series of U-shaped carrier cups 26, each of which receives one of the trimmed and weighed batches of beans. An intermittent drive means for the conveyor 27 successively indexes pairs of cups 26 to a bean receiving position below the transfer reels 52. The filled pairs of bean cups are progressively advanced to a tamping and can filling station 28 adjacent the discharge end of the conveyor 27.

Cans to be filled are fed by gravity from an elevated can chute 62 to a can conveyor 30 adjoining the conveyor 27. The can conveyor 30 operates to position a can opposite each of the two bean cups at the tamping and can filling station 28. In order to compress the beans in the cups 26 at the can filling station 28, two vertically disposed air cylinders 66 are actuated whereby a semicylindrical tamping plate associated with each cylinder descends upon the beans in each cup, and in cooperation with the bottom of the cups, forms the beans into a circular bundle of a diameter nearly as large as a can. While the bundle of beans is held in a compacted mass in each of the two bean cups indexed with cans, a pair of horizontally disposed transfer power cylinders 68 are actuated, and a circular pusher plate associated with each cylinder pushes a charge of beans into a can. During subsequent indexing of the conveyor 27, the filled cans are fed, by can conveyor 30, into a gravity discharge chute 71 to be further processed by other apparatus.

As previously explained, the weighed batches of trimmed beans collected in the scale hoppers 21' or 22', respectively, are simultaneously dumped into the feed hopper 24 of the bean aligning conveyor 48. The hopper 24 is disposed below and forwardly of the scale hoppers, as may be seen in FIG. 2, and is positioned over the feed end of the aligning conveyor 48. The hopper consists generally of four vertical sheet metal walls 72 (FIGS. 3 and 5) and a vertical central wall 74 which divides the space between the walls at the sides of the hopper into two vertically disposed passages 76 and 78. Beans which are dumped from the scale hoppers 21' and 22' are thereby guided through the hopper 24 to a feed hopper 79 of the aligning conveyor 48. The hopper 79 is adapted to guide the two separate batches of beans onto a belt 80 of the aligning conveyor. The belt is preferably made of rubber impregnated material and extends entirely across the lower end of hopper 79. As may best be seen in FIG. 5, the hopper 79 comprises two generally triangular side walls 81, only one being shown, and a transverse wall 82 which effectively closes off the lowermost end of the conveyor. Each wall 81 is positioned to form a coplanar lower extension of each side 72 of the hopper 24 between said hopper and the belt 80 of the aligning conveyor 48. To continue the separation of the two passages 76 and 78 of the feed hopper 24, below the hopper and into the chamber defined by the side walls 81 and the transverse wall 82, the lower end of the central wall 74 of the hopper terminates adjacent the upper run of the belt 80. The transverse wall 82 is secured to each side thereof by bolts 83 to outwardly directed flanges 84 (FIG. 3) of each of the two side walls 81.

To propel the beans up the inclined belt 80 into the lanes 49 and 50, two series of spaced rubber lugs 85 (FIGS. 3 and 5) are secured to the belt. The lugs are of such length that they extend from side to side of each lane 49 and 50 and are of a height that is slightly more than the thickest dimension of the largest bean usually processed. In order to permit the bean propelling lugs 85 to pass beneath the bottom edge of the transverse wall 82, said bottom edge is spaced above the belt 80 to provide an aperture 86 (FIG. 5) extending the width of the belt. Beans deposited upon the belt 80 are prevented from falling through the aperture 86 by a flexible rubber flap 87 which is affixed to the wall 82 and closes the aperture in a well known manner.

The frame of the bean aligning conveyor 48 consists of two upwardly inclined spaced parallel angle bars 92 and 93 (FIGS. 3, 5 and 6) which have upstanding flanges 92a and 93a, respectively, and are interconnected transversely of the aligning conveyor by angle bars 94 and 96 (FIGS. 5 and 8, respectively). Angle bar legs 98 are secured to both ends of each of the angle bars 94 and 96, and a tubular leg 100 (FIGS. 2 and 5) is adjustably secured at the lower end of each angle bar leg for positioning the aligner 48 at a desired height. A rigid angle bar frame 102 of rectangular configuration is secured at each of its corners to the bottom end of one of the legs 98 and provides support for a horizontal platform 103 (FIG. 5) upon which is mounted the drive motor 51. A transmission 104 is included within the housing of the motor 51.

The belt 80 is trained around a drive roller 106 (FIGS. 5 and 7) which is mounted on a shaft 107 journalled in two bearings 108. Each of the bearings 108 is secured to, and depends from, the lowermost end of one of the angle bars 92 or 93. At the upper or discharge end of the aligning conveyor, the belt 80 is trained around an idler roller 110 (FIG. 8) mounted upon a shaft 112 which is journalled in two bearings 114, only one of which is shown in FIG. 8. Each bearing 114 is secured to and depends from the upper end of one of the angle bars 92 or 93. To support the upper run of the belt 80, a flat belt support strip 117 (FIG. 6) is secured to each of the angle bars 92 and 93 and is coextensive therewith. The belt 80 is sufficiently rigid to support itself between the supports 117 in a substantially flat plane.

The lower run of the belt 80, adjacent the idler roller 110, is trained around an adjustable belt tensioning roller 116 fixed to a shaft 118. Bearings 119 for the shaft 118, only one of which is shown in FIG. 8, are each mounted alongside one of the legs 98 by means of a threaded rod 120, one end of which is secured to the bearing and the other end of which extends through a transverse angle member 122 that is fixed to the legs. A bolt 121 secures each bearing to its associated leg 98 and is movable in a vertical slot, not shown, in each leg.

In order to guide the beans into the lanes 49 and 50 and to align the beans longitudinally of the lanes, an aligning plate 132 (FIGS. 5-7) is positioned between the lanes and extends longitudinally of the belt 80 from the transverse wall 82 of feed hopper 79 to a point approximately midway of the length of the upper run of the belt 80. The lower end 132a (FIG. 5) of the aligning plate 132 is welded to the bottom edge of the wall 74 of the hopper 24 and the upper end 132b (FIG. 3) is secured to a bracket 133 which extends across the conveyor and is secured to the angle bars 92 and 93.

The aligning plate 132 (FIG. 6) is formed into two inclined planar panels 134 and 136 of rectangular shape, each extending downwardly and outwardly from a longitudinal central ridge 132c of the plate 132 which is at a uniformly elevated position above the centerline of the belt 80. The inclined portion of each panel 134 and 136 terminates at an elevation above the belt 80 only slightly higher than the height of the lugs 85 and the lower edges of the panels form vertical walls 138 and 140, respectively. The walls 138 and 140 cooperate with vertical flanges 92a and 93a of angles 92 and 93, respectively, to define the lanes 49 and 50. At the lower end of the aligning plate 132, the walls 138 and 140 symmetrically converge and become tangent at the face of the transverse wall 82 of the feed hopper 79. From the point where the walls 138 and 140 begin to converge, to a point coincident with the upper edge of the point of tangency of said walls with the wall 82, the panels 134 and 136 converge to form planar bean diverting surfaces 146 and 148, respectively (FIGS. 3 and 7). The bottom edge of the central wall 74 of the hopper 24 abuts and is welded to the longitudinal juncture of the surfaces 146 and 148. In this manner a converging passage is provided at each side of the wall 74 to effectively direct the beans from each passage 76 and 78 to the lanes 49 and 50, respectively.

To positively prevent beans from assuming a fixed position bridging the space between the aligning plate 132 and a side wall 81 in an elevated position above the reach of the propelling lugs 85, a circular agitator 158 (FIGS. 3, 5 and 7) is provided at each end of the drive roller 106 inside the walls 81 of the aligning conveyor. The two agitators 158 are in the form of thin discs and each disc is secured by screws 160 (FIG. 7) to a bearing plug 162, one plug being positioned at each end of the roller. The two bearing plugs 162 are integral with the drive roller 106 and are each secured to the shaft 107 by any suitable means, not shown, so as to thereby rotate the discs 158 when the shaft 107 is rotated.

Although several aligned beans may be carried side by side or end to end between the lugs 85 of the belt 80, means are provided toward preventing more than one layer of beans being transported by the belt. Said means comprises four circular brushes 170 (FIGS. 3, 5 and 6) arranged as an upper pair and a lower pair so as to position one brush of each pair of brushes over the lane 49 and the other brush of each pair over the lane 50. The lower pair of the brushes 170 (FIG. 3) are mounted upon a transverse shaft 172 adjacent the lower end of the aligning plate 132, and the upper pair of the brushes 170 are mounted upon a transverse shaft 174 (FIG. 5) near the top end of said plate. Drive means, which will presently be described, operate to revolve the four brushes 170 so that the peripheral surface of each brush nearest the conveyor lugs 85 is moved counter to the flow of beans being conveyed.

Drive means for the bean aligner 48 is provided by an endless chain 188 (FIGS. 3 and 5) which is trained around a drive sprocket 190 secured to a drive shaft 191 of the transmission 104, a sprocket 192 on the drive roller shaft 107, a tensioning sprocket 194 which is supported on a bracket, not shown, depending from the angle bar 93, a sprocket 196 on the brush shaft 172 and a sprocket 198 on the brush shaft 174. It will be seen in FIG. 5 that rotation of the drive sprocket 192 in a clockwise direction will move the upper run of the belt 80 upwardly and will rotate the brushes clockwise, causing the surface of the brushes 170 nearest the belt to sweep over the beans in a direction opposite to direction of upward movement of the beans.

If a bean is only partially supported by the belt 80, its advance will be blocked by a brush and it will be swept back until it becomes properly aligned upon the belt. If a bean should be temporarily supported in the manner illustrated by the bean at 164 (FIG. 7), the agitator disc 158 will, during rotation thereof, pivot the bean to a position where it can no longer be supported. In addition, it will be understood that the end of the bean that is contacted by the agitator disc 158, will be thrust forward in the direction of belt travel while the bean is pivoted at its point of contact upon the fixed aligning plate 132. That particular bean will then be in substantial end to end alignment with the length of the belt and will allow other beans which may have been supported by it to drop to the belt. The agitator discs 158 are positioned in the same vertical plane as the vertical flanges 92a and 93a of the angle bars 92 and 93, respectively. For this reason the vertical flanges 92a and 93a are cut away, as may be seen at 168 in FIGURE 5, to permit free rotation of the discs 158. The transverse wall 82 is similarly cut away to allow the upper sector of the discs 158 to lie within the feed hopper 79 of the aligning conveyor.

The brush drive shafts 172 and 174 are journaled in bearings 180 (FIGS. 3 and 4) which are mounted upon horizontal flanges 182 provided at one end 184a of each of four support bars 184. Each support bar 184 is pivoted at its opposite end 184b to a pivot bolt 186 which projects through openings in two of the arms and is fastened in one of the vertical flanges 92a and 93a of the conveyor frame. A bolt 188 extends through a slot 189 in the end 184a of each support bar 184 and is threaded into the associated vertical flange 92a or 93a. By raising or lowering the distal end of each bar 184, the brushes 170 may be vertically positioned in respect to the lugs 85 and that adjusted position maintained by the bolts 188. The desired position, illustrated in FIGURES 5 and 6, is that in which the lower sector of each pair of brushes passes close to the tops of the pusher lugs 85 of each lane 49 and 50.

It will be understood by reference to FIGURE 3 that of the initial mass of beans deposited upon the belt 20, some beans will be guided into a position approximating their desired alignment by the diverting surfaces 146 or 148 of the aligning plate 132. Other beans may temporarily bridge over the propelling lugs 85 but are prevented from remaining thus by the agitator discs 158. Some of the beans will be pushed by preceding beans to a position straddling the lane 49 or the lane 50 as they approach the lowermost pair of brushes 170. Since the lanes 49 and 50 are relatively narrow as compared to the length of a bean, the end of the beans nearest to the centerline of the conveyor will be supported in an elevated position above the belt 80 by either the panel 134 or the panel 136 of the aligning plate 132. Then, as one of the brushes 170 pushes back the end of the bean contacting the belt 80, the bean will roll off the supporting surface 134 or 136 to become aligned with the lane. If more than one layer of beans should somehow progress beyond the lower pair of brushes, the beans will again be subjected to a sweeping action by the uppermost pair of the brushes 170. These beans will either roll off the panels 134 or 136 into an aligned position upon the belt, or into an aligned position forming a second layer. The second layer of beans will again be swept back until the beans are properly positioned on the surface of the belt.

After the aligned beans of each of the two weighed batches of trimmed beans pass the brushes, they are retained in their respective lanes 49 or 50 to the point of their discharge from the aligning conveyor 48. To provide inner walls to the lanes 49 and 50 from the upper end of the aligning plate 132 to the discharge end of the aligning belt 80, two angle bars 200 (FIGS. 2 and 3) extend upwardly from the bracket 133. The upper end of each angle bar 200 is secured to a transverse strap 201 (FIGS. 2 and 8) which is welded at each end to one of the flanges 92a or 93a of the conveyor frame angles 92 or 93, respectively. When the aligned beans in each lane reach the upper limit of the belt 80, they are projected, due to their momentum, to a point beyond the idler roller 110 at the discharge end of the belt to fall upon their respective transfer reel 52. The direction of rotation of the reels 52 is in a clockwise direction as viewed in FIG. 10 and in a counterclockwise direction as viewed in FIGURE 11. Since the transfer reels are identical, and each is identically positioned in respect to its associated lane, only the reel associated with the lane 49 will be described.

With reference now to FIGURES 8, 9 and 10, it will be seen that, as previously mentioned, the transfer reel 52 has an elongated body section 202 which is deeply grooved in a longitudinal direction to provide a plurality of spaced bean pockets 204. The pockets 204 are formed by longitudinal walls 205, and as is seen in FIG. 10, each wall is inclined toward the trailing pocket. Each bean pocket provides space to contain more than one bean. The reel body 202 is longitudinally aligned with the centerline of the lane 49 and is spaced horizontally away from, and below, the discharge end of the aligner belt 80. A frusto-conical nose 206, which is secured to the reel 52 in axial alignment therewith by means of a bolt 210, provides a sloping transition surface 208 between the end of the aligner belt 80 and the reel body 202, said surface being adapted to urge the trailing end of beans projected from the end of the belt 80 toward the bean pockets 204. A stub shaft 212 extends from the end of the reel body opposite the nose 206 and is secured to the reel in any suitable manner, not shown. The shaft 212 is rotatably journalled in a bearing 220 (FIGS. 8 and 9) which is integral with and projects laterally from a vertical plate 222 that is bolted to the bean transport conveyor 27. A horizontal shelf 224 secured to the support structure of the conveyor 27 adjacent the plate 222 provides a platform for a motor 226 which, through a conventional V-belt and pulley drive 228, provides continuous rotation for both reels 52 during operation of the machine.

In FIGURES 8 and 9 it will be seen that a portion of the wall 222 adjacent each reel provides a rear wall for each pocket 204 of each reel body 202. To close the aperture between the frusto-conical noses 206 of the two reels 52, a plate 223 (FIGS. 9 and 10) is provided which slopes upwardly from the frame of the conveyor 27 toward the aligner 48. The plate 223 has an integral attachment strap 225 which is bolted to a vertical wall 227 mounted on the support structure of the conveyor 27. A plate 229 (FIG. 10) is arranged to provide a planar extension of the plate 223 extending from the opposite side of the reel associated with the lane 49. In order to extend each lane 49 and 50 over the reels 52, a rectangular plate 230 (FIGS. 8, 9 and 10) is affixed in coplanar relation to the uppermost end of each vertical flange 92a and 93a of the angle bars 92 and 93, respectively, to extend horizontally over the conveyor 27. Bar extensions 231 (FIG. 10) of each of the two walls 200 likewise extend over the conveyor 27, for a purpose to be presently explained.

The beans are guided from each lane 49 or 50 to an associated transfer reel 52 by guide means which includes two substantially vertical guide panels 240 (FIG. 10), one associated with each lane 49 and 50, which are positioned so as to extend downwardly from the lane extensions 230 or 231 at the left side of each lane as viewed in FIGURE 10. The guide panel 240 associated with the lane 50 is secured along its upper edge to the extension plate 230 while the guide panel 240 associated with the lane 49 is secured in like manner to the extension bar 231. Each of the guide panels 240 is of identical configuration, and each consists of a planar upper section 241 which is in a plane substantially tangent to its associated reel. The bottom edge of each panel 240 has a planar bean deflecting surface 242 which lies substantially in a radial plane from the axis of the associated reel 52 and is adapted to guide beans toward the reel. At the opposite side of each reel 52 is arranged a bean guide panel 244, one panel depending from the extension plate 230 of the lane 49 and the other depending from the extension bar 231 of the lane 50. Each panel 244 has an upper planar portion 246 and a lower curved portion 247 that curves around the reel 52. The curved portion 247 is closest to the periphery of the reel body 202 at a point below the horizontal centerline of the reel and the aperture provided at this point between the reel body and the panel will allow only one bean of the largest size usually processed to pass therethrough. The panels 244, however, are sufficiently flexible to be sprung away from the reel if more than one bean should be forced through the aperture at the same time.

Some of the beans projected into each reel from the aligning conveyor belt 80 will fall in a path adjacent the surface 241 of the guide panel 240 and will be directed sideways by the lower deflecting surface 242 into a pocket 204 of the reel. It will be clearly seen in FIGURE 10 that the leading surface of the trailing wall 205a of the uppermost pocket 204 cooperates with the lower deflecting surface 242 of the guide panel 240 to smoothly guide beans to the bottom of the pocket. The rotational speed of the reels is such that, after wall 205a passes out of alignment with surface 242 and beans start to fall in pocket 204' next behind, the trailing wall 205a' of the pocket 204' will advance so rapidly that beans cannot fall out of pocket 204' before the ascending pocket wall 205a' is aligned with the surface 242.

Other beans will fall directly into a pocket without contacting either of the guide members 240 or 244. If a bean should be lying upon the outer portion of a wall 205 of one of the descending pockets 204, it may fall away from the reel and will be intercepted and guided by the curved bottom end of the guide 244 to a bean transport cup 26 of the conveyor 27. Part of the beans transferred by a reel pocket 204 will remain in their associated pocket until they drop by gravity from the lowermost pocket of the reel to an indexed bean cup 26. It will be seen, therefore, that the cooperation of the guide members 240 and 244 with a reel 52 is such that the beans are dropped to an indexed cup in a manner which varies the path of fall over a wide area of the cup and yet retains their end to end alignment.

The bean transport conveyor 27 is provided with a support structure which comprises a horizontally disposed inverted channel member 250 (FIGS. 8 and 9) which extends at a right angle from a point adjacent the end of the aligning conveyor 48 to a point past the can filling or bean transfer station 28. A transverse support plate 252 (FIG. 8) is welded to and depends from the downwardly directed flanges of the channel 250 adjacent the aligning conveyor 48. At each end of the support plate 252 an angle bar leg 254 is secured by bolts 256 which extend through vertical slots, not shown, in each leg. In order to adjust the vertical height of the conveyor 27 in relation to the discharge end of the aligning conveyor 48, bolts 258 are threaded through bars 260 which are welded to the support plate 252 near the top of each leg. The end of each bolt 258 bears against one flange of an angle section 262 welded to each leg. When the bolts 256 are loosened, each leg may then be moved relative to the plate 252 by turning its associated adjustment bolt 258. The conveyor may in this manner be precisely positioned and leveled. The opposite end of the channel 250 adjacent the tamping and filling station 28 is supported in a similar manner by a transverse support plate 268 (FIG. 13) which has two angle bar legs 270, one secured at each end of the plate 268 by bolts 272 which the movable in vertical slots, not shown, in each leg.

A pair of sprocket support plates 274 (FIG. 8) are arranged to extend beyond the end of the channel 250 which is adjacent the aligner 48. One plate 274 depends from each vertical flange of the channel and each supports a bearing, not shown, in which is journalled a sprocket shaft 276 (FIGS. 1 and 8). An endless chain 278 (FIG. 8) is trained around a sprocket 280 mounted on the shaft 276 and around a sprocket 282 (FIG. 11) mounted at the discharge end of the conveyor. The sprocket 282 is secured to a shaft 284 journalled in bearings 286, only one being shown. Support for the bearings 286 is provided by two sprocket support plates 290 (FIGS. 11 and 13) which are welded to the transverse support plate 268 and extend toward the discharge end of the machine.

As may best be seen by referring to FIGURES 9 and 10, the chain 278 is provided at spaced intervals with pairs of conventional flanged chain attachment links 294. Upon the flanges of each pair of attachment links is secured a rectangular chain support plate 296. The plate 296 projects at each side of the chain 278 beyond the flanges of the links 294 and each end of the plate is engaged in an elongated slot 298 of a chain support and guide member 300. One chain support 300 extends parallel to the chain 278 at each side thereof and each is similarly constructed, but oppositely disposed, so as to provide a support and guide for substantially the entire length of the upper flight of the chain. Each chain support 300 is mounted above the top of the channel 250 by a plurality of spacer members 301 (FIGS. 9 and 13) bolted to the channel. Each support 300 is formed of an angle bar 303 (FIG. 9) positioned so that one flange thereof is vertical and the other flange extends horizontally outward from the top of the vertical flange. A spacer strip 305 of slightly greater thickness than the chain support plates 296 is secured to the top of the horizontal flange and a retaining strip 307 is secured above the spacer 305. The slot 298 is thus provided at each end of the support plates 296 to guide the chain along an elevated horizontal straight-line path above the channel member 250.

To each support plate 296 is secured one of the U-shaped bean transport cups 26. Each bean transport cup 26 generally comprises a U-shaped body section 302, open at each end, and two mounting bosses 304, one boss being provided outside the cup adjacent each open end at the base of the U-shaped body. Each cup 26 is secured to its associated support plate 296 by screws which extend through the flanges of each pair of the links 294 and the support plate 296, and are threaded into the bosses 304. The open ends of the cups extend transversely of the conveyor chain 278 and the length of the cup between the open ends is slightly greater than the length of the trimmed beans. A vertical wall 308 (FIG. 9) extends longitudinally of the conveyor 27 adjacent the rear end of the cups 26. The front end of the cups is closed by the above mentioned wall 226. Both walls 308 and 226 are secured to the retaining strips 307 at each side of the conveyor and extend from the cup filling station 55 to the can filling station 28. Drive means for the conveyor chain 278, later to be described, operate to successively index pairs of empty cups to the filling position of FIGURE 10 below the transfer reels 52 at the cup filling station 55. The aligned beans dropping from the transfer reels 52 descend in a manner which will cause some of the beans to impinge upon the inside vertical face of the leading wall of the cup. These beans slide down the wall into the smoothly contoured U-shaped pocket and form a loosely packed bundle of aligned beans of roughly circular cross-section. Other beans are deflected from the outwardly sloping upper end 304 of the leading wall and are directed thereby toward the center of the cup. As was mentioned in connection with the bean transfer mechanism, others of the beans drop from the curved bottom end of the guide panels 244 and also from the reel body 202 so that the beans descend in various paths which cover approximately half of the area of the cup.

While the aligned beans are being dropped by the transfer reels 52 to the indexed cups below the reels, the cups are continuously vibrated to cause the beans to settle therein in a manner well known and commonly used. To effect vibration of the two cups 26 at the filling station 55, a bar 306 (FIGS. 8 and 10) extends longitudinally below and in supporting relation to the rollers of the chain 278. The bar 306 is centrally supported by a vertical rod 310 welded thereto which extends downwardly through an aperture 312 in the channel member 250 and through a strap 314 positioned across the underside of the channel 250. At its lower end the rod 310 is threaded so that it can be adjustably secured to the strap by nuts 316. A pivotal mounting is provided for end 314a (FIG. 8) of the strap 314 by a depending bracket 318 welded to the outside of the channel 250. The outer end 314b of the strap 314 extends beyond the opposite side of the channel 250 and is affixed to the threaded end of a vertically disposed piston rod 319 by nuts 320 above and below the strap, respectively. An air cylinder 324 is operatively associated with the piston rod 319 and may be of any standard design capable of producing very rapid reciprocation of its piston rod. Support for the cylinder 324 includes a vertical support strap 326 (FIGS. 8 and 9), which is positioned downstream of the strap 314, and is bolted to a vertical flange of the channel 250 and to a depending tab 328 welded to the flange. The bottom of the support strap 326 (FIG. 8) is bent outwardly and is bolted to a spring steel plate 330 which extends toward the strap 314 (FIG. 10) and provides a flexible mounting platform for the air cylinder 324.

In order to intermittently advance the bean cups from the cup filling station 55 to the tamping and can filling station 28, a combination air and hydraulic drive cylinder 340 (FIGS. 11, 12 and 14) is positioned under the channel 250 upstream from the can filling station 28. The longitudinal axis of the drive cylinder 340 is in a centered position with respect to the direction of movement of the chain 278. A mounting pad 342 (FIG. 12), is bolted to the bottom of the top flange of the channel 250 and two depending plates 344, only one being shown, are welded thereto. The plates 344 are positioned one at each side of a mounting boss 346 integral with the cylinder and a bolt 348 passes through both of the plates 344 and the boss 346. The chain 278 is advanced to index successive pairs of filled cups 26 at the can filling station 28 by a pawl assembly 350 (FIG. 14) which is secured to the threaded end of a piston rod 352 of the cylinder 340. The pawl assembly 350 includes a body section 354 provided with a threaded bore to receive the piston rod 352. For a purpose which will be explained later, a central vertical flange 356 extends the length of the body section 354 and depends from the flat underside thereof. A vertical ear 358 (FIGS. 13 and 14) extends upwardly from each side of the body at the end opposite the piston rod 352, and a pivot pin 360 extends through the top end of each ear 358. A pawl 362 is pivotally mounted on pin 360 between the ears 358 and has a lower portion 362a projecting below pin 360. As is most clearly shown in FIGURE 14, the upper ends of the ears 358 extend through the top of the channel member 250 and an elongated central slot 359 in channel member 250 allows reciprocation of the pawl assembly 350.

The pawl 362 has an arcuate chain-roller engaging surface 362b (FIG. 14) at its leading upper end, and the pawl is so constructed that the lower portion 362a below the pivot pin 360 is heavier than the upper portion. In order to prevent the upper portion of the pawl from tipping rearwardly when the piston rod is driving it forward, a small stop block 364 is welded across the leading surface of the ears 358 in a position to block forward movement of the leading lower edge of the pawl. Thus the pawl is locked in a vertical position until the driving stroke of the piston rod 352 is completed (illustrated in FIGURE 14) and will pivot out of engagement with the rollers of the chain 278 during the return stroke of the piston rod. At the end of the return stroke of the piston rod (illustrated in FIGURE 11), the pawl will return to a vertical position as the heavier lower portion 362a of the pawl returns by gravity to its former position. In order to keep the pawl assembly 350 in its upright and aligned position, the flange 356 depending from the underside of the body portion 354 is guided by a pair of longitudinally disposed angle bars 370 (FIGS. 11–13). As is seen in FIGURE 13, the angle bars 370 are oppositely disposed so as to have one flange of each angle vertically positioned at each side of the flange 356 to provide a guideway for the flange. The other flange of each angle bar 370 provides a horizontal support surface upon which the flat underside of the body portion 354 rests. The angles 370 are mounted at the discharge end of the conveyor by means of a pad 372 (FIG. 11) welded across the ends of the angles and secured to the transverse support plate 268. Both of the angle bars 370 are supported at their opposite end by a U-shaped strap 374 bolted to the outside of the depending flanges of the channel 250. The angle bars rest upon the base of the strap and are welded to both the base and to a reenforcing bar 376 extending from side to side of the strap at the ends of the bars.

Illustrated in FIGURE 14 is a stop assembly 378 which provides a positive stop for the driving stroke of the piston rod 352 and also provides, in cooperation with the pawl assembly 350, a positive lock to prevent both override and backlash of the conveyor chain 278. The stop assembly 378 comprises a mounting pad 380 extending across the tops of the angles 370 and abutting the support plate 268. Two mounting ears 382 are welded to the upper surface of the pad 380 and are angled toward the pawl assembly 350. Between the upper ends of the ears 382 a stop member 384 is pivotally mounted by a pivot pin 386. The upper end of the stop 384 above its pivot pin 386 extends through the slot 359 in channel 250. The stop is inclined toward the plate 268 as seen in FIG. 14 and is provided with an arcuate end adapted to engage the leading periphery of a chain roller. When the stop 384 is in the actuated position illustrated in FIG. 14, the leading edge of the end of the stop below the pivot pin 386 abuts a stop block 388 which is welded to the pad 380 and positioned between the ears 382. The trailing edge of the lower portion of the stop 384 abuts the stop block 364 of the pawl assembly 350. Thus, the stop member 384 is held locked in position while the pawl assembly 350 is forced against the stop 384 by the drive cylinder 340, and the chain 278 cannot move either forward or backward. The stop block 388 is threaded to receive a vertically positioned stop bolt 390. When the piston rod 352 is retracted into the cylinder 340, the stop block 364 of the pawl assembly is moved out of engagement with the trailing lower end of the stop member 384 and the heavier upper end thereof drops by gravity to contact the stop bolt 390. In this position, the arcuate end of the stop 384 is out of engagement with a chain roller, and the pawl assembly 350 may then again index two more filled cups at the can filling station 28 after the next driving stroke of the drive cylinder 340. Near the end of each driving stroke of the cylinder, the leading face of the stop block 364 contacts the lower portion of the stop member 384. The stop 384 is thereby pivoted into the position illustrated in FIGURE 14 to positively stop and to accurately position the conveyor chain 278 and its associated bean cups 26. At the same time, the pawl 362 is in engagement with the trailing periphery of the succeeding chain roller and will prevent backlash of the chain as long as fluid pressure in the cylinder 340 urges the piston 352 out of cylinder 340. It will be seen, therefore, that the pawl assembly 350 and the stop mechanism 378, in cooperation with each other provide simple mechanical means to accurately position and secure the conveyor chain 278 at the completion of each cup indexing movement of the chain.

In order to compact the loosely nested bundle of beans in each of the two bean cups 26 at the can filling station 28, one of the compacting cylinders 66 (FIGS. 11 and 14) is vertically disposed above each cup. The cylinders 66 are bolted to the upper surface of a horizontal platform 402. The platform 402 is supported by a pedestal 404 (FIG. 13) which is mounted upon a support bracket 406 extending outwardly from the right side of the conveyor 27.

The pedestal 404 (FIGS. 11 and 13) comprises a vertical shaft 408, secured at its upper end to the underside of the platform 402 and extending through a cylinder mounting boss 410 at its lower end. A base plate 412 of the support bracket 406 is bolted to one of the depending flanges of the channel 250 and end plates 414, extending outwardly from each end of the plate 412, support a horizontal platform 416. The boss 410 is welded to the platform 416 and the shaft 408 is adjustably secured therein at a selected vertical elevation. A compacting plate mounting block 418 (FIGS. 13 and 14) is secured to the end of each piston rod 420 of the cylinders 66 and a depending plate 422 is bolted to each block. Along the lower edge of each plate 422 is welded a semicylindrical tamping plate 424.

Each tamping plate 424 has a concave lower surface of nearly the same length as a bean cup which and, when the plate is lowered to its functional position between the cup walls, it will compact the beans therein into a circular bundle. The tamping plates 424 are each guided in their properly oriented position in relation to a cup by a horizontally disposed guide strap 426 (FIGS. 11 and 13) which extends from each mounting block 418 towards the support bracket 406. At its distal end, each strap 426 is disposed for movement in a straight line vertical path in a guide slot 428 (FIGS. 11 and 14) of an upstanding guide plate 430 associated with each strap. Each guide plate 430 is bolted to the vertical flange of an angle bracket 432. The horizontal flange of each bracket 432 is bolted to the upper surface of the platform 416, and each bracket 432 additionally mounts one of the horizontally disposed bean transfer cylinders 68.

To effect the transfer of a compacted bundle of beans from one of the cups 26 to a can indexed opposite the beans, each transfer cylinder 68 is provided with a circular plunger 436 (FIGS. 13 and 14). Each plunger 436 is of a diameter slightly less than the inside diameter of one of the cans to be filled so that the plunger may fully seat the charge of beans within the can. It will be understood by reference to FIGURE 13 that the walls 308 and 227 which extend throughout the can filling station 28 must be apertured to allow both plungers 436 to traverse the length of their associated cups and pack the beans into the can indexed therewith. A circular aperture 311 (FIG. 15) is provided in the wall 227 opposite each plunger and is of a size only slightly larger than the diameter of a plunger. A similar aperture, not illustrated, is provided in the wall 308 opposite each plunger 436.

The can conveyor 30 comprises an endless chain 440 (FIGS. 11, 13 and 15), the upper run of which is at the same elevation as the upper flight of the conveyor chain 278 and is disposed in spaced parallel relation thereto. A stub shaft 442 (FIG. 13) is secured to a side plate 444 of the can conveyor 30 which is positioned on the upstream side of the support plate 268. An idler sprocket 446 (FIG. 15) of the can conveyor 30 is mounted on the stub shaft 442 and a drive sprocket 448, of the same size as the sprocket 282, is secured to the shaft 284 at the discharge end of the conveyor 27. As the conveyor chain 278 of the conveyor 27 is driven, the shaft 284 is rotated by the sprocket 282. Thus the can conveyor drive sprocket 448 secured to the same shaft is rotated at the same speed and provides advance of the can conveyor 30 at the same speed as the bean conveyor 27. The chain 440 is trained around the sprockets 446 and 448, and by means of a spaced series of attachment links 452 carries a plurality of can transport cups 454. Each of the cups 454 on the chain 440 is in alignment with one of the bean cups 26.

As is best seen in FIG. 15, each can cup 454 comprises a central U-shaped body section which is secured to the chain 440 in a manner identical to the mounting of the bean cups 26. A rectangular chain support plate 453 (FIG. 13) is provided for each can cup 454 and each plate is interposed between the body of the cup and the flanges of the attachment links 452. The upper flight of the chain 440 is supported substantially throughout its length by the support plates 453, which are arranged to move in a guide slot provided by one of the guides 300 and by a guide 455 affixed to a wall of the can conveyor 30. Each cup 454 is provided at its upper end with arms or ledges 456 which extend in opposite directions longitudinally of the chain 440 and the upper side of each arm 456 provides a flat planar support surface. The ends of the arms 456 of each cup 454 on the upper flight of the chain 440 are disposed close to the ends of the arms of the next cup so that the space between the U-shaped bodies of adjacent cups is bridged by the platform provided by the coplanar upper surfaces of the arms of said cups.

As is seen in FIGURE 15, the trailing arm 456 of the trailing one of the pair of cups indexed at the can filling station 28, and the leading arm of the cup trailing that particular cup, cooperate to support the lowermost can in the can chute 62. A can is deposited by gravity into the U-shaped body of each cup 454 as it advances beneath the can chute 62 during the indexing movement of the machine. The cans are held down in their respective cups by a can retaining strap 460 (FIGS. 11, 13 and 15) which extends over the lane of can cups from the can chute 62 to the gravity discharge conveyor 71. Two support straps 462 (FIGS. 13 and 15) are secured to the retaining strap 460 and each strap 462 is supported by a vertical rod 464, only one being shown, welded to the frame of the can conveyor 30. In order to guide the cans in a straight-line path and also to provide a support to prevent endwise movement of the cans during filling thereof, a vertical wall 466 (FIGS. 11 and 13) extends the length of the can conveyor 30 adjacent the closed end of the cans. The wall 466 is formed of two coplanar plates and is secured to vertical angle bar members 468, only one being shown, in FIGURE 13, which are each secured to the wall 444.

After a pair of cans are filled at the can filling station 28, the next indexing movement of the conveyor 27 will also advance can conveyor 30 and the leading can cup 454 and bean cup 26 of that pair to a point beyond and beneath the feed end of the discharge gravity conveyor 71. The filled can contained in the cup 454 advanced to this position is removed from the cup pocket by two downwardly inclined bars 470 (FIGS. 13 and 15). One bar 470 is disposed at each side of a can cup 454 at about the point where the upper flight of the chain 449 begins to descend. Successive cups 454 descend between the bars 470 leaving the cans supported upon the inclined bars. The filled cans descending through the discharge conveyor 71 are guided by side walls 472 of the conveyor to the end thereof where they may be conveyed by other means to other apparatus which will complete the canning and cooking process.

*Operation*

A description of the electrical and hydraulic control circuit of FIGURE 16 will be made in conjunction with a further description of the operation of the apparatus of the present invention. In FIG. 16 the electrical conductors are indicated by single lines, while the conduits are indicated by double lines. It should be noted here that certain of the electrical and hydraulic control elements are contained in a control box (not illustrated) placed near the machine and operatively connected to the machine by conduits containing the necessary air pressure piping, hydraulic piping, and electrical wiring.

Electrical energy of 220 volts A.C. is supplied to the control circuit (FIG. 16) by three conductors L1, L2, and L3, which are connected to a main disconnect switch 482. Conductors 484 are connected to the lines L1, L2 and L3 and to a manual starter 486 which is electrically connected to the motor of a motor-driven air pump unit 488. A conduit 490 leading from the pump supplies air under a pressure of about 80 p.s.i. through conduits 490a, 490b and 490c to a reducing valve RV. A conduit 492 leading from the reducing valve RV acts as a low pressure manifold and supplies air at a pressure of approximately 15 p.s.i. to several control elements which will later be described.

In order to time the duration of the operating cycle of the various electrical and air operated components of the machine, a cycling timer C is provided. The cycling timer C comprises six electrical switches S1 to S6, inclusive, which are actuated by a cam C1 associated with each switch. All of the cams C1 are driven from a common drive shaft DS by a motor M. Because the cams are diagrammatically illustrated, it will be understood that the rotative position of each cam does not indicate the exact timing of the associated switches S1 to S6, inclusive. The cycling timer motor M provides one revolution of the associated camshaft DS each time a manually operated momentary contact switch 494 is closed.

The cycling time C is stopped at a "zero" position after one revolution of its camshaft when switch S1 associated therewith opens. At this zero position, current from conductor L3 flows through the closed switch S6 of the cycling timer to energize a conductor L3–1 beyond the switch S6. One conductor of the motor M is connected to L3–1 and the other conductor of the motor is connected to L1 through the momentary contact switch 494. Switch S1 is open at the zero position but closes immediately after the motor M is energized by the actuation of the momentary contact switch 494. The current from L1 is then carried by the closed S1 contacts to the motor M. Upon the completion of one revolution of the camshaft of the cycling timer, the contacts of S1 open to deenergize the motor M. For easy access by the attendant who is stationed adjacent the scale hopper 22', the switch 494 is positioned upon that end of the support table 45. In order to start each cycle of operations of the machine, the attendant must depress the actuator for switch 494 after both scale hoppers 21' and 22' contain the required amount of beans.

One cycle of operation of the machine includes the following operations: dumping the beans from both scale hoppers, aligning the beans from each scale hopper, transferring each aligned batch of beans to one of a pair of bean cups, advancing the pair of cups a distance equal to twice the spacing between cups, indexing a can simultaneously with said advance with each of another pair of cups, compacting the beans in each of said other pair of cups, and transferring the beans of each of that pair of cups to a can. During one cycle of operation, the scale hoppers are again filled and as soon as the proper weight is attained in each hopper, the attendant may initiate another cycle.

To prepare the machine for operation, the drive motor 32 of the bean cutter 18 is energized and the motor 51 of the bean aligner is energized, both by means not shown. The drive motor 226 of the transfer reels 52 is also energized, by means not shown. The main disconnect switch 482 is closed and a switch 496 (FIG. 16) is closed to energize the vibrator 39. Also, the starter 486 is actuated to energize the motor of the pump 488 and cause air pressure to be supplied from the conduit 490 to the various air cylinder controls later described.

Whole green beans, previously washed and roughly graded to a size within certain limits, are fed into the bean cutter 18 by any suitable means and in a random mass. The beans are trimmed at both ends to an approximately uniform length and are deposited upon the elevating conveyor 19. The beans are elevated and dropped into the accumulation box 35 and the vibrator 39 causes the beans to gravitate to the leading edge of the box and fall to the vibrating feeding unit 20. From the upper pan 40 of the unit, the beans drop into the two troughs 42 and 43 of the lower pan 41, one at each side of the machine, and descend from the troughs over the normally lowered gates 42' and 43', respectively.

When each of the scale hoppers contain the proper weight of beans, an electrical circuit is completed in a manner to be presently described, and the gates 42' and 43' shut off the flow of beans. Provision is made in the electrical circuit to independently operate the gates 42' and 43'. The attendant then adds beans to those contained in each hopper 21' and 22' until both pilot lights 46 are lighted, which signifies that each hopper contains at least a desired minimum weight of beans. Upon completing this manual operation, the attendant then presses the actuator of the switch 494 to initiate one cycle of operation of the machine.

A control relay CR1 (FIG. 16) is associated with one of the scales 21 or 22 which will be referred to as scale A, and a control relay CR2 is associated with the other scale which will be identified as scale B. Relay CR1 has an operating coil 497 and relay CR2 has an operating coil 498. The coil 497 has three contactors associated therewith, CR1–1, CR1–2 and CR1–3. The coil 498 likewise operates three contactors, CR2–1, CR2–2 and CR2–3. A switch 500 is provided in the mechanism of scale B, and a switch 501 is provided in the mechanism of scale A. Each of the switches 500 and 501 has a set of normally open contacts and a set of normally closed contacts. Conductor L1 is connected through the normally closed contacts of switches 500 and 501 to the vibrator 39 which is also connected directly to conductor L3.

When a predetermined weight of beans has been deposited in each scale hopper, the normally open contacts of each switch 500 and 501 will be closed by mechanism incorporated in the associated scale. This closing of the switches 500 and 501 may be simultaneous or may occur at different times. With the assumption that the switch 500 of scale B has just been actuated, the circuit effecting the closure of the associated gate will be traced.

With the actuation of the switch 500, the circuit to the vibrator 39 through switch 500 is broken. However, the circuit to the vibrator 39 is still complete through the switch 501, so the vibrator continues to function until both scale hoppers contain the desired weight of beans. Through conductor 502, the coil 498 of the relay CR2 is energized and all the contactors CR2–1, CR2–2 and CR2–3 are closed. CR2–1 is a "hold" contactor which bypasses the switch 500, while contactors CR2–2 and CR2–3 complete the flow of current to a solenoid 504 which actuates a valve 506. The valve 506, as well as all of the other solenoid operated valves in the control circuit, is provided with a spring return. When solenoid 504 is energized, the valve is shifted so that a passage 508 of the valve 506 directs low pressure air from the line 492 to one of the gate cylinders 44. The piston rod of the cylinder 44 is forced out of the cylinder and actuates linkage which closes the associated gate and stops the flow of beans onto scale B.

The coil 497 of relay CR1 is actuated to close contacts CR1–1, CR1–2 and CR1–3 by the actuation of the switch 501 in a manner similar to the operation just described, and the gate, which controls flow to scale A, is closed. When both of the gates have been closed, the attendant adds beans to each hopper until the hoppers are depressed to a point corresponding to the weight desired for the beans in each hopper. A switch is thereby actuated by the scale mechanism of each hopper, namely, a switch 510 and a switch 512. The switch 512 is provided with two contactors, 512–1 and 512–2. When the one scale comes up to weight, contacts of switch 510 are closed and a circuit is completed to light the associated pilot light 46. When the desired weight is reached in the other scale the contacts 512–2 of switch 512 are closed and a circuit is completed to light the other pilot light 46. The attendant is thereby visually signalled that each scale hopper contains the desired weight for one can-filling charge of beans. He may then press the switch 494 to start the cycling timer C. When the switch S2 of the cycling timer C is closed, a circuit supplying current to a solenoid 514 is completed from conductor L3 through switches 510 and 512. A valve 516 is thereby actuated to direct low pressure air through a passage 518 of the valve to the lower end of the dump cylinder 47. The piston rod of the cylinder 47 is actuated and the two scale hoppers are simultaneously dumped. The upper end of the cylinder is vented to the atmosphere by a passage 519. It will be noted that, when switch S2 is subsequently opened, the solenoid 514 is deenergized and the scale hoppers return to their former position. Also, when the batch of beans is discharged from the scale hopper, the scale beam permits the switch 500 or 501 to open, deenergizing the associated gate solenoid. The gate then opens and beans are again discharged into the scale hopper to form a new batch.

Each weighed batch of beans is deposited upon the continuously driven belt of the bean aligner from the hoppers 21′ and 22′ and, in a separate lane for each batch, the beans are aligned and elevated to the continuously rotating transfer reels 52. The aligned beans are then transferred from the reels 52 to the indexed bean cups below the reels on the bean transport conveyor 27. Vibration of the pair of cups indexed at the cup filling station 55 is continuous. A conduit 522, which communicates with air conduit 490c, supplies high pressure air to the air cylinder 324 through a flow control valve 523. After a brief delay to insure that all of the beans of each weighed batch of beans have been placed in a cup, switch S3 of the timer closes to cause the conveyor 27 to be advanced to index two more empty cups below the reels 52. Movement of the conveyor is accomplished in the following manner. When switch S3 of the timer closes, an electrical circuit is completed from conductor L3 through L1–A to L1 to energize a solenoid 520 of an air valve 524. The valve 524 is actuated upon energization of the solenoid 520 to position a passage 526 thereof in communication with the high pressure line 522 and with a flow control valve 528. A conduit 530 connects the control valve 528 to a sealed oil reservoir 532 and the high pressure air admitted into the reservoir forces oil into the cylinder 340 to effect a power stroke of the piston therein. Oil is utilized for the power stroke of the cylinder 340 because it provides a slow and smooth advance of the conveyor 27. In the manner previously explained, the pawl assembly 350 advances the conveyor 27 a distance equal to twice the spacing of the cups thereon. Immediately after the conveyor 27 has advanced, the switch S4 of the cycling timer C closes and a circuit is completed from L3 through conductor L1–B to L1, and current is supplied to a solenoid 534 of an air valve 536. A passage 538 of the valve 536 is thereby shifted to supply high pressure air to the upper end of the two compacting cylinders 66 and, as a result, the associated plate of each cylinder compacts the beans in the cup indexed below the cylinder. While the compacting plates are in their lowered position, the switch S5 of the cycling timer C closes and current is carried by conductors L3, L1–C and L1 to a solenoid 540 which operates an air valve 542. A passage 544 of the valve 542 directs high pressure air from the conduit 490 to a conduit 546 which supplies air for a driving stroke of both bean transfer cylinders 68. The plungers of the transfer cylinders are pushed against the beans of the two cups indexed therewith and the beans of each cup are projected into an indexed can.

A conduit 548 interconnects the lower ends of the tamping cylinders 66, and the plunger end of each transfer cylinder 68 has a conduit 550 connected to the conduit 548. The conduit 548 is also connected to the drive cylinder 340, at the end associated with the pawl assembly 350, by a conduit 552 which is connected to the low pressure air line 492 at 558. Accordingly, as soon as switches S3, S4, and S5 open to deenergize the associated solenoids and permit the valves to return to normal position, low pressure air from line 492 returns the tamping plates to their upper position and the transfer plungers and the power piston to their withdrawn position.

The air forced from the cylinders is exhausted to the atmosphere through a passage 554 of the valve 536 associated with the tamping cylinders 66 and through a passage 556 of the valve 542 associated with the transfer cylinders 68. It will be noted that, during each cycle, the outward movement of the plunger of the power cylinder 340 forces air through line 552 into the tamping cylinders and the transfer cylinders. Thus the tamping plates and plungers are positively withdrawn during each indexing movement of the conveyor 27.

FIGURES 17 and 18 illustrate a modified form of the vibrating feed unit 20, the upper level collecting pan 40 and the lower level pan 41. With the modifications to be described, the machine is made completely automatic and will function without the presence of an operator to manually add beans to the weighed batches or to initiate each cycle of operations. Since the other parts of the machine will not be changed, they will not be described in detail and will be referred to, when necessary, by the reference numbers previously assigned thereto.

Trimmed green beans issuing from the aperture 36 of the accumulating box 35 are collected in a vibrating feed unit 558, which includes an upper level collecting pan 560 and a lower level collecting pan 562. The upper pan 560 is walled at its sides and front and has an open rearward end provided with a centrally positioned diverting wall 564 which channels the beans into two lanes. The lower level feed pan 562 is positioned beneath and extends rearwardly of the upper pan 560 and is formed of two parallel main troughs 566 and 568 each of which forms a lane for the beans dropping from the upper pan 560 at each side of the diverting wall 564. Above the main troughs 566 and 568, and coextensive therewith, are mounted narrow auxiliary troughs 570 and 572, respectively, which are adapted to collect and discharge small quantities of beans. Each auxiliary trough 570 and 572 is secured to the front end wall 573 of its associated main trough in an elevated position in which the front end of its bottom wall abuts the bottom panel of the upper pan 560 to form a planar extension thereof. The rearward end of each auxiliary trough 570 and 572 is mounted upon a support bar 574 welded across the upper end of each of the main troughs 566 and 568. The flow of beans from each of the main troughs 566 and 568 is regulated by a hinged gate 566' and 568', respectively. Each gate is pivoted upon a transversely extending rod 576 mounted beneath the adjacent bottom panels of the main troughs, and each gate is arranged to be moved to open or closed position by the air cylinder and linkage 44 under the control of an electrical control circuit. Each gate 566' and 568' is adapted to form a downwardly inclined chute, when in its lowered position, over which the beans are guided into the scale hoppers 21' and 22'. When the gates are in the raised position shown in FIGURE 18, the upper end of each gate lies below the bottom of its associated auxiliary trough 570 or 572 in a position which does not close the end of the auxiliary trough.

In order to regulate the flow of beans from the auxiliary troughs 570 and 572, a solenoid operated gate unit 580 is mounted adjacent the end of each auxiliary trough. Since the two gate units 580 are of identical construction, but oppositely disposed, only the gate unit for the trough 572 will be described.

A vertically positioned angle bar 582, suitably secured to a frame member near the bottom of the machine, has a horizontal platform 584 welded to its upper end. At its outer end, the platform 584 has a vertical post 586 welded thereon, and a gate arm 588 is pivotally mounted near one of its ends to the upper portion of the post 586. The free end of the gate arm 588 overlies the end of the trough 572 and has an end portion 588a directed toward the trough 572 and a resilient gate-forming pad 590 is secured to the end portion. A solenoid 592 is mounted upon the platform 584, and the armature of the solenoid is connected to a depending tab secured to the gate arm 588. An adjustably mounted compression spring 594 disposed between the gate arm 588 and the platform 584 urges the gate arm upwardly, when the solenoid 592 is deenergized, to a position where the gate-forming pad 590 is spaced above the trough 572. When the solenoid 592 is energized, the gate arm 588 is pivoted to move the gate pad 590 into a position in which it closes off the end of the trough 572.

During operation of the machine, beans are caused to gravitate to the leading edge of the accumulation box 35 by the vibration imparted to the box by the vibrator 39. In the automatic embodiment of the machine, the vibrator 39 is continuously operating except when the scale hoppers 21' and 22' are dumping, in order that the auxiliary troughs 570 and 572 will continue to discharge small quantities of beans until their associated gate units 580 are actuated.

Some of the beans are directed by the diverting wall 564 of the upper pan 560 into the main troughs 566 and 568. Others of the beans are caused to enter the auxiliary troughs 570 and 572 of the vibrating feed unit 588, and gravitate to the rearward ends thereof.

Both of the gates 566' and 568' of the main troughs 566 and 568 are in a lowered chute-forming position at the start of an operating cycle. Likewise, both of the gate units 580 are in a position allowing beans to drop from the auxiliary troughs 570 and 572 into their respective scale hoppers. When a scale hopper receives a certain predetermined weight of beans from both its associated main and auxiliary troughs, an electrical circuit is completed by a scale switch, not shown, which is actuated by the balance beam of its scale 21 or 22. The associated gate of that hopper is thereby raised by its gate cylinder and linkage 44. Thus the flow of beans from the main trough to its hopper is stopped, but the auxiliary trough above the gate continues to discharge small quantities of beans. When the desired weight of beans in the scale hopper is reached, another electrical switch, not shown, is actuated by the balance beam. An electrical circuit is thereby completed which energizes the solenoid 592 of the gate unit 580 and the gate pad 590 is lowered to seal the end of the auxiliary trough.

When both scale hoppers 21' and 22' each contain the proper weight of beans for one can filling charge, the scale hoppers are simultaneously dumped by the same mechanism employed in the semi-automatic machine. The beans dumped from the scale hoppers 21' and 22' are deposited upon the aligning conveyor 25 and continue their advance through the machine in the same manner previously described.

It will be understood that the switches actuated by the scale mechanisms 21 and 22 to stop the flow of beans from the main troughs are the same switches used for that purpose in the semi-automatic machine. Also, the switches which were employed to light the pilot lights 46 of the semi-automatic machine, instead energize the solenoids of the gate units 580 to stop the flow of beans, and energize the motor of the cycling timer C to initiate the cycle of operations already described.

From the foregoing description it will be seen that the machine of the present invention provides a high speed packing line, either automatic or semi-automatic, for trimming, weighing and packing elongate foodstuffs into cans. With no modifications other than certain dimensional changes, the machine functions as efficiently with glass containers as it does with cans. Labor costs connected with its operation are at an absolute minimum since only one attendant is required for the semi-automatic machine and none is required for the automatic machine. Furthermore, the machine is of simplified construction, requiring no complex gear trains or controls and will operate for extended periods with but little attention. The transfer mechanism utilizing fluted reels will be recognized as providing a novel means, accurate in function, for transferring elongate objects either singly or in groups.

It will be understood that the invention is not limited to the precise details of construction illustrated but that various modifications and variations may be resorted to without departing from the scope or spirit of the invention, and I deem myself entitled to all such modificattions and variations as come within the scope of the appended claims.

Having thus described my invention, what I claim as new and desire to protect by Letters Patent is:

1. A bean packing machine comprising means for forming a batch of string beans of predetermined weight, orienting means for arranging the beans of said batch in substantially parallel relation and conveying the beans lengthwise along a predetermined path, a bean carrier arranged to receive all of the beans of said batch, transfer means positioned between said orienting means and said bean carrier and including a generally cylindrical continuously rotated reel having a plurality of elongated recesses formed in its peripheral surface parallel to the axis of rotation of said reel for receiving oriented beans from said orienting means and transferring them to said carrier, means mounting said bean carrier for movement at right angles to said path, a container carrier movable along a path parallel to and adjacent the path of said bean carrier, means for intermittently advancing both of said carriers in synchronism, said advancing means being arranged to position a container adjacent to and in alignment with the bean carrier, and means for transferring articles from said bean carrier to the container on said container carrier during a period when said carriers are stationary.

2. A machine for packing elongate articles comprising a pivotally mounted article receptacle movable between an article receiving position and an article discharge position, means for forming articles into a batch of a predetermined weight in said receptacle, article orienting and conveying means disposed below said receptacle to receive articles discharged therefrom, means responsive to the formation of a batch of articles of predetermined weight in said receptacle for moving said receptacle to discharge position to discharge the articles in random formation into said orienting and conveying means, means for actuating said orienting and conveying means to arrange the elongate articles in substantially parallel relation and convey the articles lengthwise along a predetermined path to unsupported positions beyond the discharge end of said orienting and conveying means, transfer means mounted adjacent the discharge end of said orienting and conveying means for receiving each batch of articles discharged therefrom and for discharging the articles into said article carrier, said transfer means including a rotatable reel provided with elongate recesses for receiving said articles, means for rotating said reel, and means associated with said carrier for forming the articles in said carrier into a predetermined formation for insertion into a container.

3. A packing machine comprising orienting means for arranging a batch of articles in substantially parallel relation and conveying the articles along a predetermined path to the discharge end of said orienting means, a first conveyor having a plurality of elongate article carriers disposed transversely of said conveyor and movable along a path normal to said predetermined path, a generally cylindrical continuously rotated article transfer reel for intercepting and transferring the aligned articles to said article carriers, said reel having a plurality of elongate article receiving recesses formed in its periphery parallel to its axis of rotation for receiving articles singly and in multiples from said orienting means, means for compacting the articles in a carrier into a generally cylindrical unit, means for moving a cylindrical container having an open end to a position adjacent said carrier with the open end directly opposite the compacting unit, and pusher means movable throught said carrier to push the compacted unit of articles therefrom into the container.

4. A packing machine comprising orienting means for arranging a batch of articles in substantially parallel relation and conveying the articles along a predetermined path to the discharge end of said orienting means, a first conveyor having a plurality of spaced article-receiving carriers movable along a path normal to said predetermined path, a generally cylindrical continuously rotated article transfer reel for intercepting and transferring the aligned articles to said article carriers, said reel having a plurality of elongate article receiving recesses formed in its periphery parallel to its axis of rotation for receiving articles singly and in multiples from said orienting means, a second conveyor mounted alongside said first conveyor and having a plurality of container-receiving carriers, means for positioning in each carrier of said second conveyor a container having an open end adjacent said first conveyor, means for driving said conveyors in synchronism to position an article carrier on said first conveyor adjacent to and in alignment with the open end of a container in a carrier of said second conveyor, and means movable transversely of said first conveyor to engage articles in an article carrier and push the articles into a container on said container carrier during the period of alignment of the two carriers.

5. A machine for packing elongate articles comprising an article receptacle movable between an article receiving position and an article discharge position, dumping means for moving said receptacle to discharge position, means for forming articles into a batch of a predetermined weight in said receptacle, article orienting and conveying means disposed below said receptacle to receive articles therefrom and adapted for arranging the elongate articles in substantially parallel relation and conveying the articles lengthwise along a predetermined path, means for actuating said orienting and conveying means to project the aligned articles to an unsupported position beyond the discharge end thereof, an article carrier disposed at a receiving station adjacent the discharge end of said orienting and conveying means, article transfer means arranged to collect each batch of unsupported articles discharged from said orienting and conveying means and discharge the batch into an article carrier, means mounting said carrier for movement along a fixed path, a tamping member mounted above the path of movement of said carrier for downward movement to engage articles in said carrier, drive means operatively connected to said carrier and arranged when actuated to move said carrier from said receiving station to a fixed position at a transfer station under said tamping member, a pusher disposed alongside the carrier at the transfer station and mounted for movement between a position spaced from said carrier to a position within said carrier in engagement with articles therein, means for positioning an open ended container adjacent said carrier at said transfer station to receive articles pushed from said carrier by said pusher, power means for actuating said tamping member and said pusher, and control means responsive to the formation of a batch of articles of a predetermined weight in said receptacle for sequentially actuating said dumping means to cause the batch to be discharged into said orienting and conveying means, actuating said drive means to move said carrier with the batch of articles therein to said transfer station, activating said power means to move said tamping member downwardly into engagement with articles in said carrier, and then actuating said pusher to transfer articles to the container.

6. In a packing machine, a conveyor having a conveying surface movable along a fixed path, means for arranging elongate articles on said surface in a position generally lengthwise of the direction of movement of said conveying surface, an article-receiving member disposed adjacent to and at a lower elevation than the discharge end of said conveying surface to receive articles therefrom, means defining at least one elongate pocket in said article-receiving member disposed generally parallel to the direction of movement of said conveying surface, means providing a slanted guide surface on said article receiving member adjacent each pocket and between the discharge end of said conveyor and said pocket, and means for moving each guide surface and its associated pocket to a position in which said conveyor, said surface and said pocket are aligned in the direction of movement of articles on said conveyor, whereby articles discharged from said conveyor will be guided by said guide surfaces into associated pockets.

7. An automatic green bean processing machine comprising a trimming device arranged to receive a random mass of whole green beans and trim each bean to a desired length, conveying means having an inlet end disposed adjacent said trimming device to receive trimmed beans therefrom and having an elevated discharge end, a scale having a hopper spaced from the discharge end of said conveying means, a vibrating bean feeding mechanism disposed between said scale and said conveyor and arranged to receive beans from said conveyor and feed the beans to the hopper of said scale, a gate movable from an open position to a closed position stopping the discharge of beans from said feeding mechanism, power means for moving said gate between open and closed positions, means mounting said scale hopper for pivoting movement between a generally horizontal bean receiving position to an inclined bean discharge position, power means for moving said hopper between said receiving and said discharging positions, bean orienting and conveying apparatus having a receptacle disposed directly below said scale hopper to receive beans discharged therefrom to convey said beans out of said receptacle and along a predetermined path, an article carrier disposed adjacent to and at a lower elevation than the discharge end of said conveying surface, said carrier having a plurality of elongated pockets disposed generally parallel to the path of movement of said conveying surface, a transfer reel mounted between said bean orienting and conveying apparatus and said article carrier and being adapted to receive the aligned beans of each batch discharged from said conveying surface and to discharge the beans into one of said article carriers, a pusher mounted at a position spaced from the discharge end of said conveying surface, an endless chain connected to said carrier to move said carrier from a bean receiving position adjacent the discharge end of said conveying surface to a bean transfer position adjacent to and in alignment with said pusher, power means for actuating said chain to move said carrier from said receiving position to said transfer position, a compacting plate mounted above said carrier at said transfer position, power means for moving said plate downwardly to engage and compact beans in said carrier, means movable with said endless chain for positioning an open-ended container in alignment with said carrier at said transfer station and disposed on the opposite side of said carrier from said pusher, power means for actuating said pusher to move said pusher into engagement with beans in said carrier to move the beans into said container, and control means operatively connected to the power means associated with said gate, said scale hopper, said compacting plate and said pusher and responsive to the formation of a batch of beans of a predetermined weight in said scale hopper for initiating a cycle of operation including the sequential closing of said gate, the pivoting of said scale hopper to discharge position to cause the batch of beans to be discharged into said orienting and conveying apparatus, the actuating of said endless chain to move said carrier and an open-ended container to said bean transfer station, the moving of said compacting plate downwardly to compact beans in said carrier, and the activating of said pusher to transfer the beans into said container, said control means being arranged to maintain said gate in closed position until the first batch of beans has been delivered from said orienting and conveying apparatus to said carrier.

8. A bean packing machine comprising means for forming a batch of string beans of predetermined weight, orienting means for arranging and conveying the beans of said batch in sustantially parallel relation lengthwise along a predetermined path and projecting the aligned beans to an unsupported position beyond the discharge end of the orienting means, a generally cylindrical continuously rotated transfer reel for intercepting and transferring the aligned beans, said reel having a plurality of elongated bean receiving recesses formed in its periphery parallel to the axis of rotation of said reel for receiving beans singly and in multiples therein from said orienting means, a bean carrier movable to a position beneath said transfer reel for receiving the beans gravitated from said recesses, means mounting said bean carrier for movement in a direction normal to said path, a container carrier movable along a path parallel to and adjacent the path of said bean carrier, means for intermittently advancing both of said carriers in synchronism, said advancing means being arranged to position a container adjacent to and in alignment with the bean carrier, and means for transferring beans from said bean carrier to the container on said container carrier during a period when both of said carriers are stationary.

References Cited in the file of this patent
UNITED STATES PATENTS

| | | |
|---|---|---|
| 2,309,471 | Moore | Jan. 26, 1943 |
| 2,319,900 | DeBack | May 25, 1943 |
| 2,327,888 | Hanson | Aug. 24, 1943 |
| 2,467,278 | Thompson | Apr. 12, 1949 |
| 2,555,816 | Rhodes et al. | June 5, 1951 |
| 2,630,908 | Anderson | Mar. 10, 1953 |
| 2,671,550 | Schultz | Mar. 9, 1954 |
| 2,698,478 | Heisterkamp et al. | Jan. 4, 1955 |
| 2,758,697 | Schultz | Aug. 14, 1956 |
| 2,829,478 | Engleson et al. | Apr. 8, 1958 |
| 2,908,420 | Hoffmann et al. | Oct. 13, 1959 |
| 2,983,088 | Stoeckel | May 9, 1961 |